US011913283B2

(12) United States Patent
MacKarvich

(10) Patent No.: US 11,913,283 B2
(45) Date of Patent: Feb. 27, 2024

(54) LADDER WALKTHROUGH

(71) Applicant: Charles J. MacKarvich, Atlanta, GA (US)

(72) Inventor: Charles J. MacKarvich, Atlanta, GA (US)

( * ) Notice: Subject to any disclaimer, the term of this patent is extended or adjusted under 35 U.S.C. 154(b) by 0 days.

(21) Appl. No.: 17/878,970

(22) Filed: Aug. 2, 2022

(65) Prior Publication Data

US 2023/0048647 A1 Feb. 16, 2023

Related U.S. Application Data

(60) Provisional application No. 63/295,166, filed on Dec. 30, 2021, provisional application No. 63/231,464, filed on Aug. 10, 2021.

(51) Int. Cl.
*E06C 7/18* (2006.01)
*E06C 7/48* (2006.01)

(52) U.S. Cl.
CPC ................ *E06C 7/182* (2013.01); *E06C 7/48* (2013.01)

(58) Field of Classification Search
CPC . E06C 7/181; E06C 7/182; E06C 7/48; E06C 7/486
See application file for complete search history.

(56) References Cited

U.S. PATENT DOCUMENTS 596,427 A * 12/1897 Richey .................... E06C 7/182 38/DIG. 2
2,140,828 A * 12/1938 Carle ........................ E06C 1/36 248/214
2,327,317 A * 8/1943 Randall ..................... E06C 7/44 182/214
2,815,160 A 12/1957 Gilmour et al.
2,881,028 A * 4/1959 Baird ........................ E06C 7/16 182/120
3,136,384 A 6/1964 Sweeney et al.
4,060,150 A 11/1977 Hughes
4,311,210 A * 1/1982 Jackson .................. E06C 7/486 182/20
4,600,079 A 7/1986 McBride
4,932,498 A * 6/1990 Miller ....................... E06C 7/48 248/210
5,012,895 A 5/1991 Santos
5,060,757 A * 10/1991 Wyche .................... E06C 7/083 182/228.3
5,242,031 A 9/1993 Ashley
5,743,356 A 4/1998 Mitchell
(Continued)

FOREIGN PATENT DOCUMENTS

GB 2498405 A * 7/2013 ............. E06C 7/182

OTHER PUBLICATIONS

Mackarvich, Charles J.; Non-Final Office Action for U.S. Appl. No. 15/899,199, filed Feb. 19, 2018, dated Jun. 27, 2019, 21 pgs.

*Primary Examiner* — Colleen M Chavchavadze
(74) *Attorney, Agent, or Firm* — Taylor English Duma LLP

(57) ABSTRACT

A ladder walkthrough assembly can include a ladder; and a ladder walkthrough including a frame and a guide post, the frame coupled to the ladder the guide post coupled to the frame and extending upwards above a top end of the ladder. The frame can include a first bracket coupled to a first side rail of the ladder and a second bracket coupled to a second side rail of the ladder.

21 Claims, 20 Drawing Sheets

(56) References Cited

U.S. PATENT DOCUMENTS

| | | | | | |
|---|---|---|---|---|---|
| 5,833,028 | A | 11/1998 | Ramsey et al. | | |
| 5,855,252 | A * | 1/1999 | Vrolyks | E06C 7/48 | 182/214 |
| 5,931,258 | A * | 8/1999 | Lorentz | E06C 7/182 | 182/106 |
| 5,941,343 | A | 8/1999 | Kelsey | | |
| 6,394,229 | B1 * | 5/2002 | Hastreiter | E06C 1/345 | 248/210 |
| 6,739,349 | B2 * | 5/2004 | Kastenschmidt | B60R 3/005 | 137/15.16 |
| 6,851,518 | B1 * | 2/2005 | Walker | E06C 7/42 | 248/210 |
| 6,913,114 | B1 * | 7/2005 | Blehm | E04D 15/00 | 182/104 |
| 6,959,785 | B1 * | 11/2005 | Chilton | E06C 1/39 | 248/188.5 |
| 6,997,283 | B2 * | 2/2006 | Wollenberg | E06C 7/48 | 248/210 |
| 7,066,299 | B1 * | 6/2006 | Fleming | E06C 7/48 | 182/127 |
| D537,958 | S | 3/2007 | Clark et al. | | |
| 7,322,442 | B2 * | 1/2008 | Clark | E06C 7/182 | 182/106 |
| 8,235,175 | B1 * | 8/2012 | Feldhaus | E06C 7/48 | 403/359.1 |
| 8,602,163 | B2 * | 12/2013 | Davis, Jr. | E06C 7/48 | 182/106 |
| 8,839,906 | B1 * | 9/2014 | Furr | E06C 7/482 | 182/214 |
| 8,839,907 | B2 * | 9/2014 | Davis, Jr. | E06C 7/48 | 182/106 |
| 8,839,908 | B2 * | 9/2014 | Davis, Jr. | E06C 7/182 | 182/106 |
| 9,103,486 | B2 * | 8/2015 | Crowley | F24F 13/32 | |
| D760,917 | S | 7/2016 | Ellis | | |
| 9,540,875 | B2 | 1/2017 | Ellis | | |
| 9,932,771 | B1 * | 4/2018 | Bramwell | E06C 7/182 | |
| 10,883,310 | B2 * | 1/2021 | Johnson | E06C 7/48 | |
| 2004/0079584 | A1 | 4/2004 | Blythe et al. | | |
| 2005/0023084 | A1 | 2/2005 | Lazarus | | |
| 2005/0236227 | A1 | 10/2005 | Clark et al. | | |
| 2008/0190692 | A1 * | 8/2008 | Feik | E06C 7/182 | 182/107 |
| 2008/0202850 | A1 | 8/2008 | Anderson et al. | | |
| 2008/0251316 | A1 | 10/2008 | Libert et al. | | |
| 2009/0277720 | A1 * | 11/2009 | Henderson | E06C 7/48 | 182/214 |
| 2010/0096215 | A1 | 4/2010 | Mcfarlane | | |
| 2010/0122871 | A1 * | 5/2010 | Gottlinger | E06C 5/02 | 182/106 |
| 2010/0230208 | A1 * | 9/2010 | Hsiao | E06C 7/182 | 182/129 |
| 2010/0326770 | A1 * | 12/2010 | Clifford | E06C 7/423 | 182/214 |
| 2011/0247895 | A1 | 10/2011 | Smith | | |
| 2012/0160608 | A1 | 6/2012 | Davis, Jr. | | |
| 2012/0175188 | A1 * | 7/2012 | Xu | E06C 7/50 | 182/107 |
| 2013/0228536 | A1 * | 9/2013 | Crowley | A47B 43/003 | 211/26 |
| 2014/0041965 | A1 * | 2/2014 | Hess | E06C 7/48 | 29/428 |
| 2016/0215563 | A1 | 7/2016 | Ellis | | |
| 2016/0222729 | A1 | 8/2016 | Shih | | |
| 2018/0258697 | A1 * | 9/2018 | Torin | E06C 7/182 | |
| 2018/0327002 | A1 | 11/2018 | Nasrabad et al. | | |
| 2019/0055784 | A1 | 2/2019 | Kazanjian | | |
| 2019/0128065 | A1 | 5/2019 | Christianson | | |
| 2019/0218860 | A1 * | 7/2019 | Seabold | E06C 7/46 | |
| 2019/0257152 | A1 * | 8/2019 | MacKarvich | E06C 7/48 | |
| 2020/0109601 | A1 * | 4/2020 | Forseth | E06C 7/46 | |
| 2020/0248507 | A1 * | 8/2020 | Moss | E06C 7/182 | |
| 2022/0112768 | A1 * | 4/2022 | Lopez | E06C 7/182 | |
| 2022/0136328 | A1 * | 5/2022 | Lajoie | E06C 7/188 | 182/206 |

* cited by examiner

LADDER WALKTHROUGH

CROSS-REFERENCE TO RELATED APPLICATIONS

This application claims the benefit of U.S. Provisional Application No. 63/231,464, filed on Aug. 10, 2021, and U.S. Provisional Application No. 63/295,166, filed on Dec. 30, 2021, which are each hereby incorporated by reference in their entirety.

TECHNICAL FIELD

This disclosure relates to ladders. More specifically, this disclosure relates to a ladder walkthrough for a portable ladder.

BACKGROUND

Portable ladders, such as straight ladders, are commonly used on worksites to reach elevated locations. For example, a ladder can be used to reach an elevated surface, such as a roof or second floor, by leaning the ladder against an edge of the elevated surface and climbing the ladder to reach the surface. Once a worker has climbed to the top of the ladder, the worker must move from the ladder to the elevated surface, such as by stepping around the side of the ladder or by crawling over the end of the ladder to transition to the elevated surface. These maneuvers can be awkward and can potentially destabilize the worker, the ladder, or both, which can lead to the worker falling off the ladder or the ladder falling over after the worker has moved to the elevated surface. Additionally, the weight of the ladder and the worker can cause damage to structures on the edge of the roof, such as gutters.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a ladder walkthrough assembly comprising a ladder; and a ladder walkthrough comprising a frame and a guide post, the frame coupled to the ladder the guide post coupled to the frame and extending upwards above a top end of the ladder.

Also disclosed is a ladder walkthrough assembly comprising: a ladder; and a ladder walkthrough comprising at least one guide-post assembly, the at least one guide-post assembly comprising a guide post and at least one clamp secured to the guide post, the at least one clamp receiving the ladder.

Also disclosed is a method for using a ladder walkthrough assembly comprising a ladder walkthrough and a ladder, the method comprising: coupling the ladder walkthrough to the ladder comprising: engaging a first clamp of the ladder walkthrough with a first side rail of the ladder; and engaging a second clamp of the ladder walkthrough with a second side rail of the ladder; and positioning the ladder walkthrough assembly against a structure.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
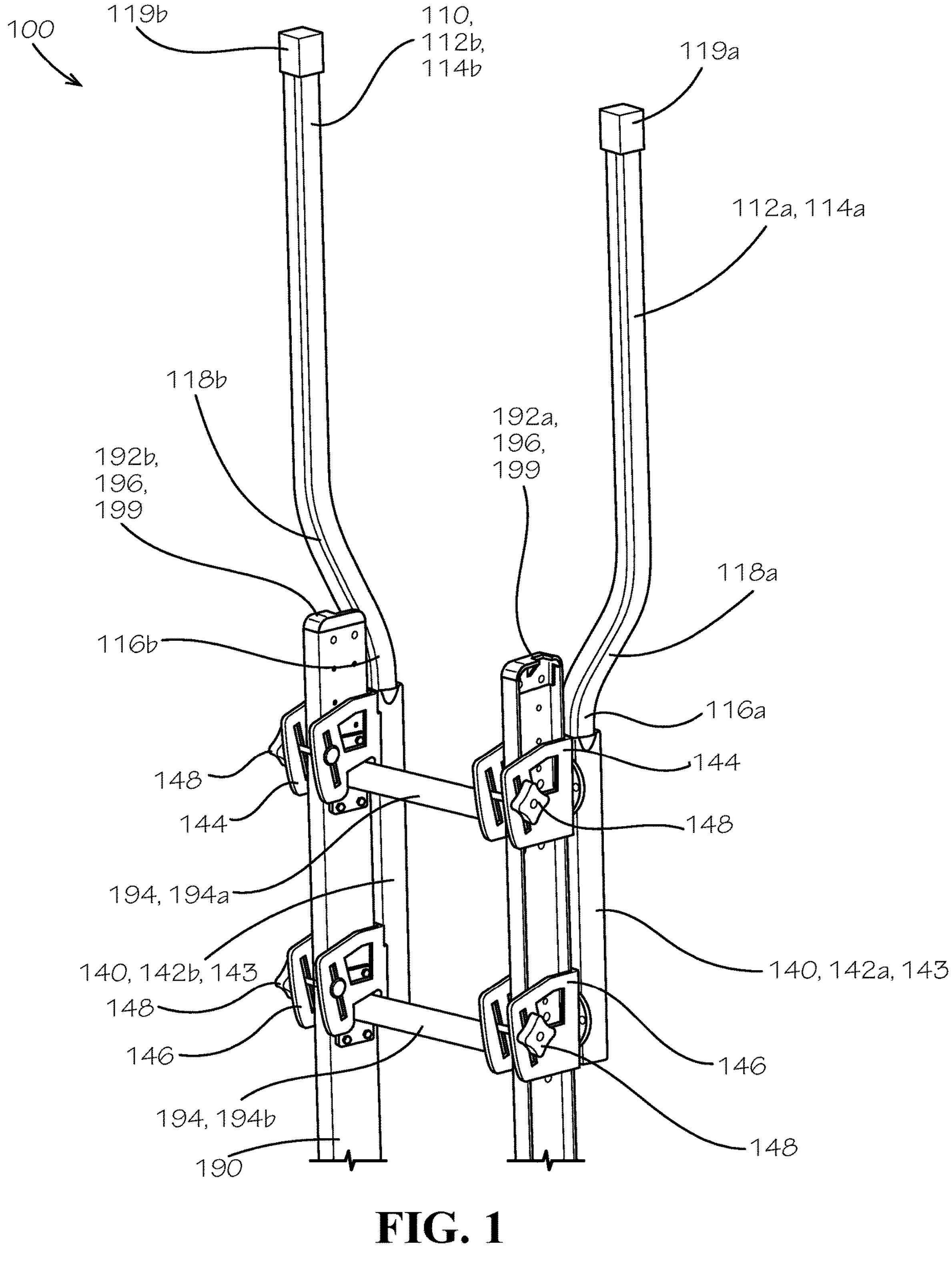
FIG. 1 is a front perspective view of a ladder walkthrough assembly comprising a ladder and a ladder walkthrough in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a ladder walkthrough assembly and associated methods, systems, devices, and various apparatus. The ladder walkthrough assembly can comprise a ladder and a ladder walkthrough. It would be understood by one of skill in the art that the disclosed ladder walkthrough assembly is described in but a few exemplary aspects among many. No particular terminology or description should be considered limiting on the disclosure or the scope of any claims issuing therefrom.

FIG. 1 is a front perspective view of a ladder walkthrough assembly 100 comprising a ladder walkthrough 110 and a ladder 190 in accordance with one aspect of the present disclosure. In the present aspect, the ladder 190 can be a straight ladder. The ladder 190 can comprise a pair of side rails 192*a,b* and a plurality of rungs 194. The rungs 194 can extend between and be coupled to each of the side rails 192*a,b*. A top end 199 of the ladder 190 is shown. Each of the side rails 192*a,b*, can define a rail end 196, and the rail ends 196 can define the top end 199 of the ladder 190. The rung 194 nearest the top end 199 can be a top rung, or first rung, 194*a*. The rung 194 below the top rung 194*a* can be a second rung 194*b*.

The ladder walkthrough 110 can comprise a pair of guide posts 112*a,b* and a frame 140. Each guide post 112*a,b* can define a top portion 114*a,b*, a bottom portion 116*a,b*, and a transition portion 118*a,b*. The bottom portions 116*a,b* can be coupled to the frame 140. In the present aspect, the bottom portions 116*a,b* can be received by the frame 140 to couple the guide posts 112*a,b* to the frame 140.

The transition portions 118*a,b* can extend between the respective top portions 114*a,b* and bottom portions 116*a,b*. The transition portions 118*a,b* can be shaped to space the top portions 114*a,b* further apart than the bottom portions 116*a, b*. In the present aspect, the bottom portions 116*a,b* can be substantially aligned with the side rails 192*a,b*, and the top portions 114*a,b* can be spaced outward from the side rails 192*a,b*. In the present aspect, the top portions 114*a,b* can be substantially parallel to the bottom portions 116*a,b*. The transition portions 118*a,b* can be angled relative to each of the top portions 114*a,b* and the bottom portions 116*a,b*. In some aspects, the transitions portions 118*a,b* can define a curved shape, such as a compound curved shape for example and without limitation.

The frame 140 can comprise a first bracket 142*a* and a second bracket 142*b*. In the present aspect, the first bracket 142*a* can be separate from the second bracket 142*b*. In some aspects, the first bracket 142*a* can be coupled to the second bracket 142*b*, such as with one or more crossbars (not shown). The brackets 142*a,b* can receive the bottom portions 116*a,b* of the guide posts 112*a,b*. The guide posts 112*a,b* can define a rectangular or square cross-sectional shape. The brackets 142*a,b* can define a complimentary shape and size, and when the guide posts 112*a,b* are received within the brackets 142*a,b*, the guide posts 112*a,b* can be prevented from rotating relative to the brackets 142*a,b*.

Each bracket 142*a,b* can comprise a tube 143 coupled to an upper clamp 144 and a lower clamp 146. The clamps 144,146 of each respective bracket 142*a,b* can receive one of the side rails 192*a,b*. For example, the clamps 144,146 of the first bracket 142*a* can both receive the side rail 192*a*. Each bracket 142*a,b* can couple to a different side rail 192*a,b* of the ladder 190. Each clamp 144,146 can comprise a tightener 148, which can be utilized to tighten the clamps 144,146 onto the side rails 192*a*, as described in greater detail with respect to FIGS. 4 and 5. In the present aspect, the tightener 148 can be a bolt and a thumb nut, for example and without limitation. The clamps 144,146 can be configured to fit over the rungs 194 of the ladder 190. Engagement between the clamps 144,146 and the rungs 194 can prevent the brackets 142*a,b* from sliding down the ladder 190, such as while the clamps 144,146 are being tightened with the tighteners 148. As shown, the upper clamp 144 can engage with the top rung 194*a*, and the lower clamp 146 can engage with the second rung 194*b*; however, the clamps 144,146 can be engaged with any of the rungs 194 as desired.

With the brackets 142*a,b* engaged with the top rung 194*a* and the second rung 194*b*, the guide posts 112*a,b* can extend upwards above the top end 199 of the ladder 190. The guide posts 112*a,b* can comprise protective caps 119*a,b* positioned at opposite ends from the brackets 142*a,b*.

Figure 2:
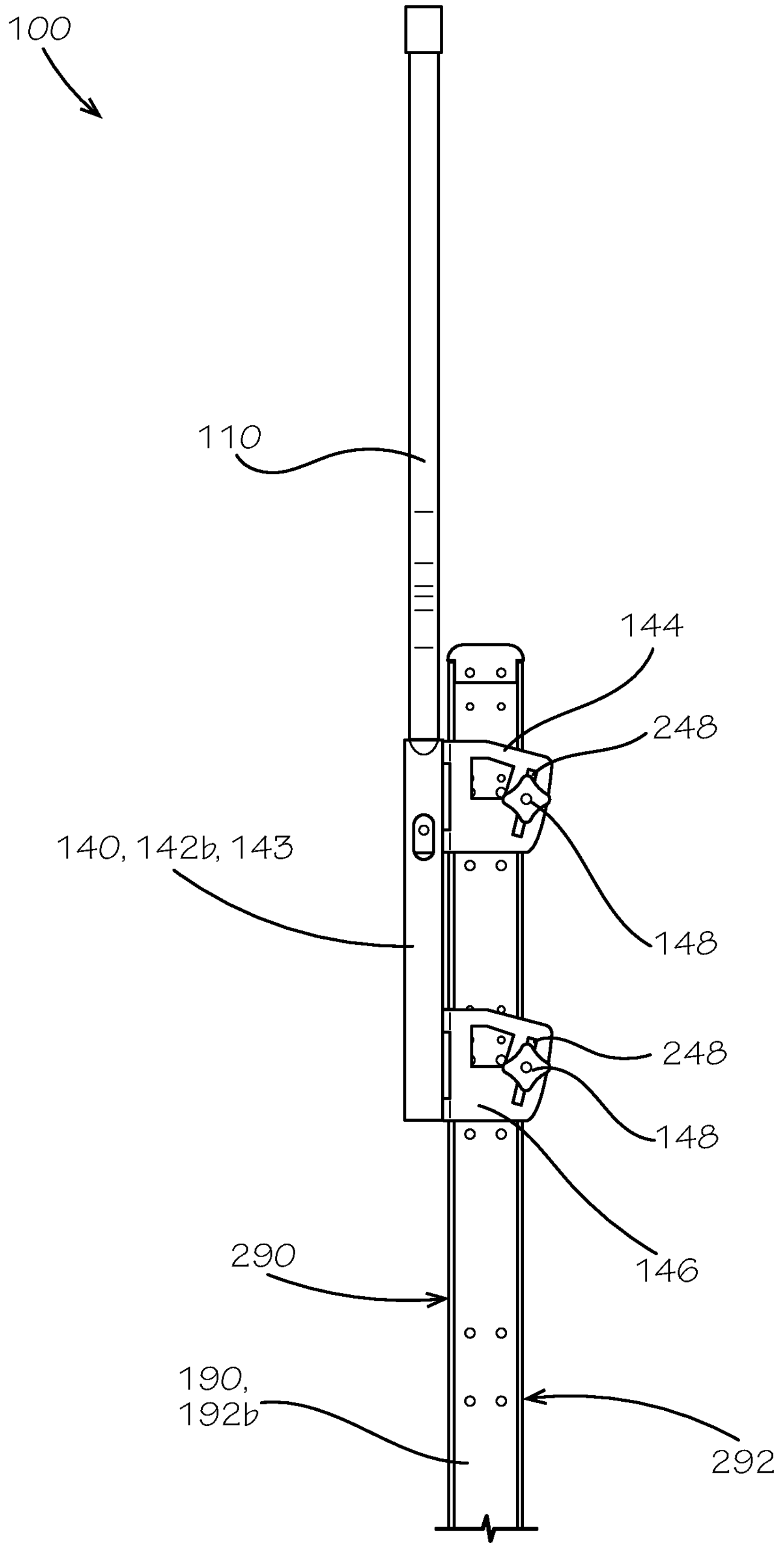
FIG. 2 is a side view of the ladder walkthrough assembly of FIG. 1.

FIG. 2 is a side view of the ladder walkthrough assembly 100 of FIG. 1. As demonstrated by the side rail 192*b*, each side rail 192*a,b* (side rail 192*a* shown in FIG. 1) can define a first ladder surface 290 and a second ladder surface 292 of the ladder 190. The tighteners 148 can be received within angled slots 248 of the upper clamp 144 and the lower clamp 146. The angled slots 248 can be oriented diagonal to the tubes 143. The angled slots 248 can provide flexibility for the brackets 142*a,b* (bracket 142*a* shown in FIG. 1) of the frame 140 to accommodate ladders 190 of varying thicknesses, as measured between the first ladder surface 290 and the second ladder surface 292. Sliding the tighteners 148 within the angled slots 248 can move the tighteners 148 closer or further from the tubes 143. For example, the first ladder surface 290 can be placed against the clamps 144, 146, and the tighteners 148 can slide in the angled slots 248 until the tighteners 148 contact the second ladder surface 292. The tighteners 148 can then be tightened down to secure the frame 140 to the ladder 190.

Figure 3:
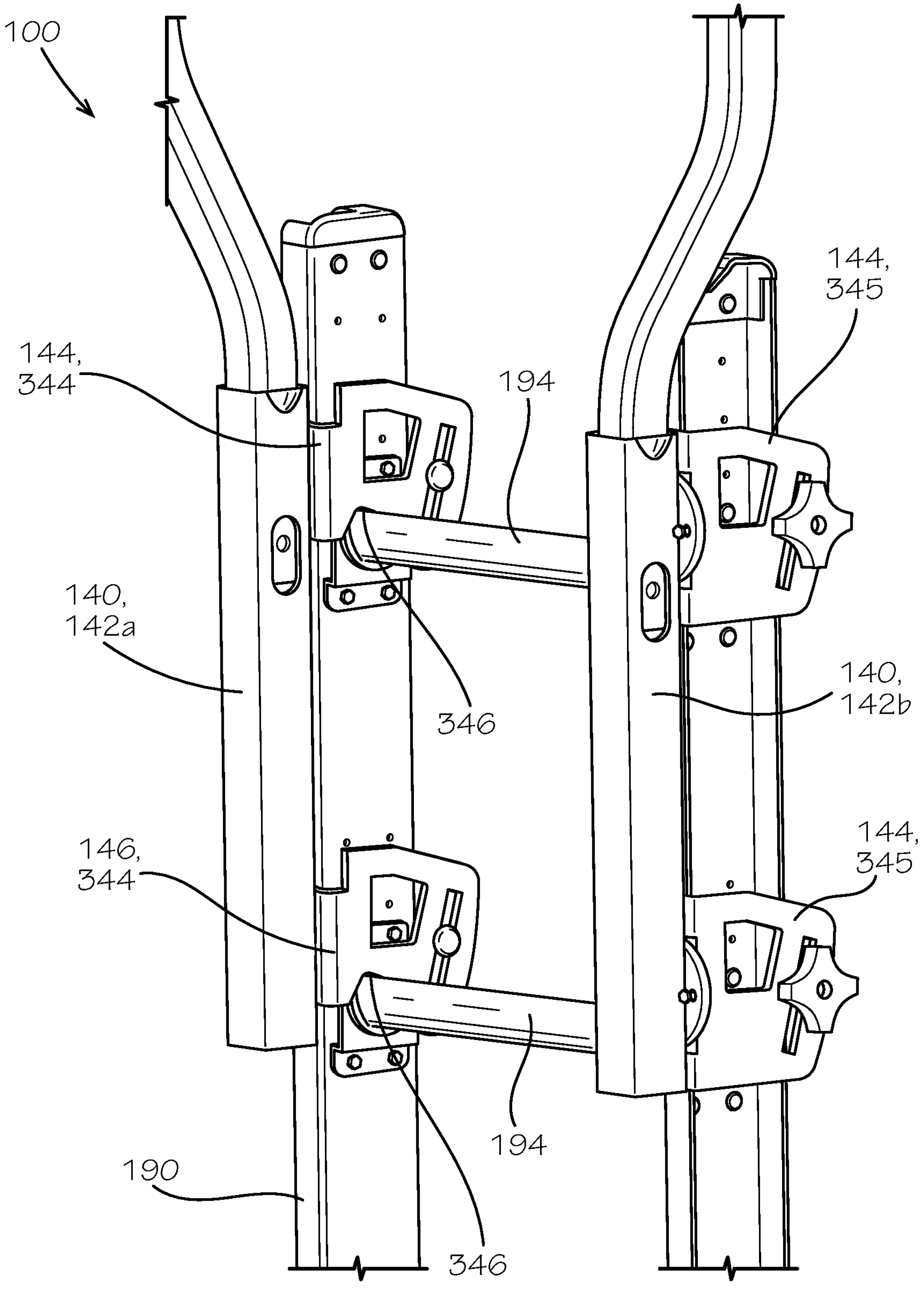
FIG. 3 is a rear detail perspective view of the ladder walkthrough assembly of FIG. 1.

FIG. 3 is a perspective detail view of the frame 140 and the ladder 190 of the ladder walkthrough assembly 100 of FIG. 1. The upper clamps 144 and the lower clamps 146 can each comprise an inner clamping plate 344, as shown by the first bracket 142*a*, and an outer clamping plate 345, as shown by the second bracket 142*b*. The inner clamping plates 344 can each define a rung notch 346, which can be shaped to hook over rungs 194 of the ladder 190.

Figure 4:
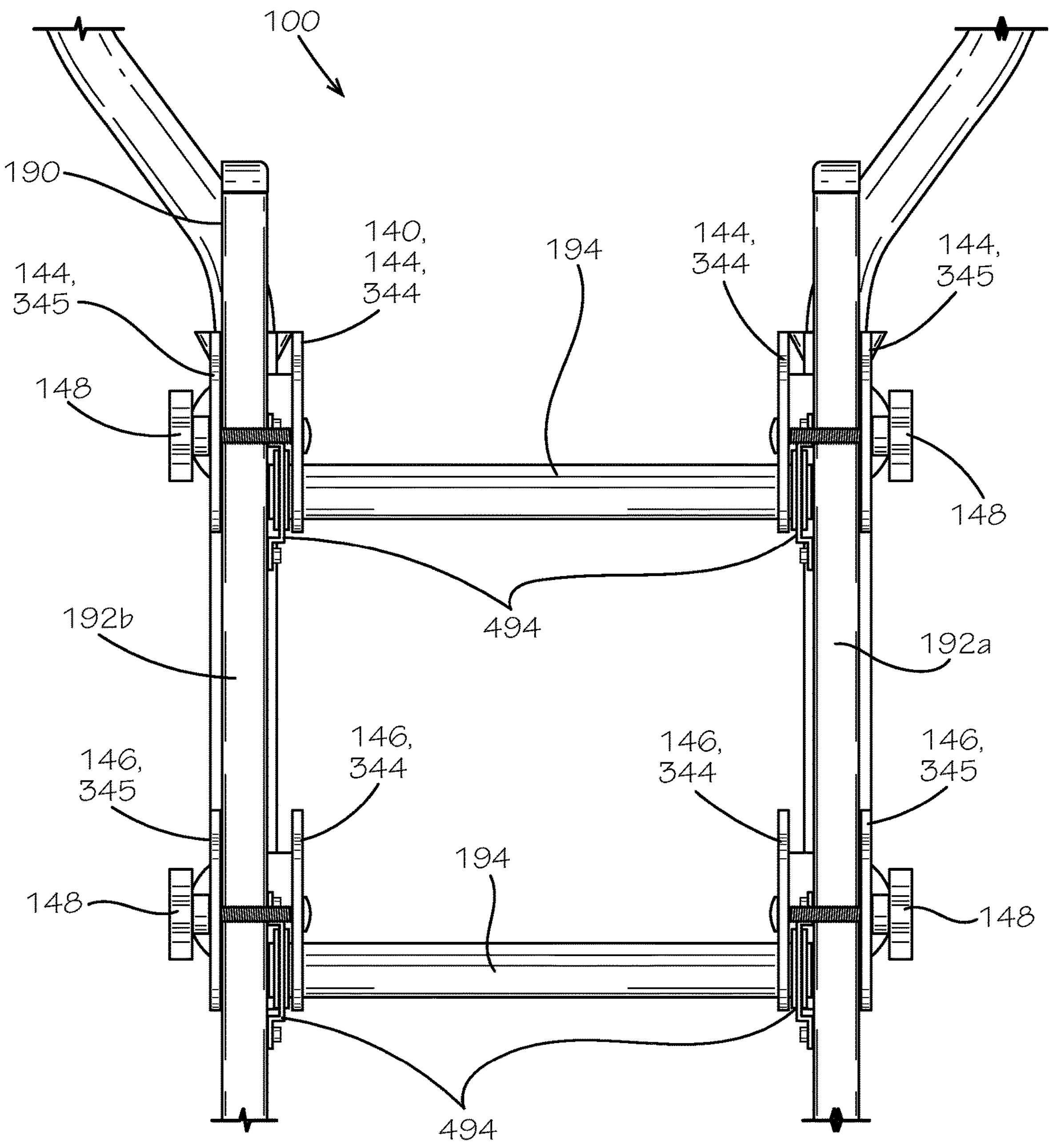
FIG. 4 is a rear perspective detail view of the ladder walkthrough assembly of FIG. 1.

FIG. 4 is a rear detail view of the frame 140 and the ladder 190 of the ladder walkthrough assembly 100 of FIG. 1. In the present aspect, the rungs 194 can be mounted to the side rails 192*a,b* by rung flanges 494 positioned between the side rails 192*a,b*. In some aspects, the rungs 194 may not comprise the rung flanges 494. For example and without limitation, the rungs 194 can penetrate the side rails 192*a,b* in some aspects.

The clamps 144,146 are shown in a loosened state, wherein one or both of the inner clamping plate 344 and the outer clamping plate 345 of each clamp 144,146 can be spaced apart from the side rail 192*a,b* and/or the rung flanges 494. The clamps 144,146 can be tightened with the tighteners 148 so that the inner clamping plates 344 and the outer clamping plates 345 each engage one of the side rails 192*a,b* or one of the rung flanges 494. In some aspects, the inner clamping plates 344 can engage one of the side rails 192*a,b*, rather than the rung flanges 494.

Figure 5:
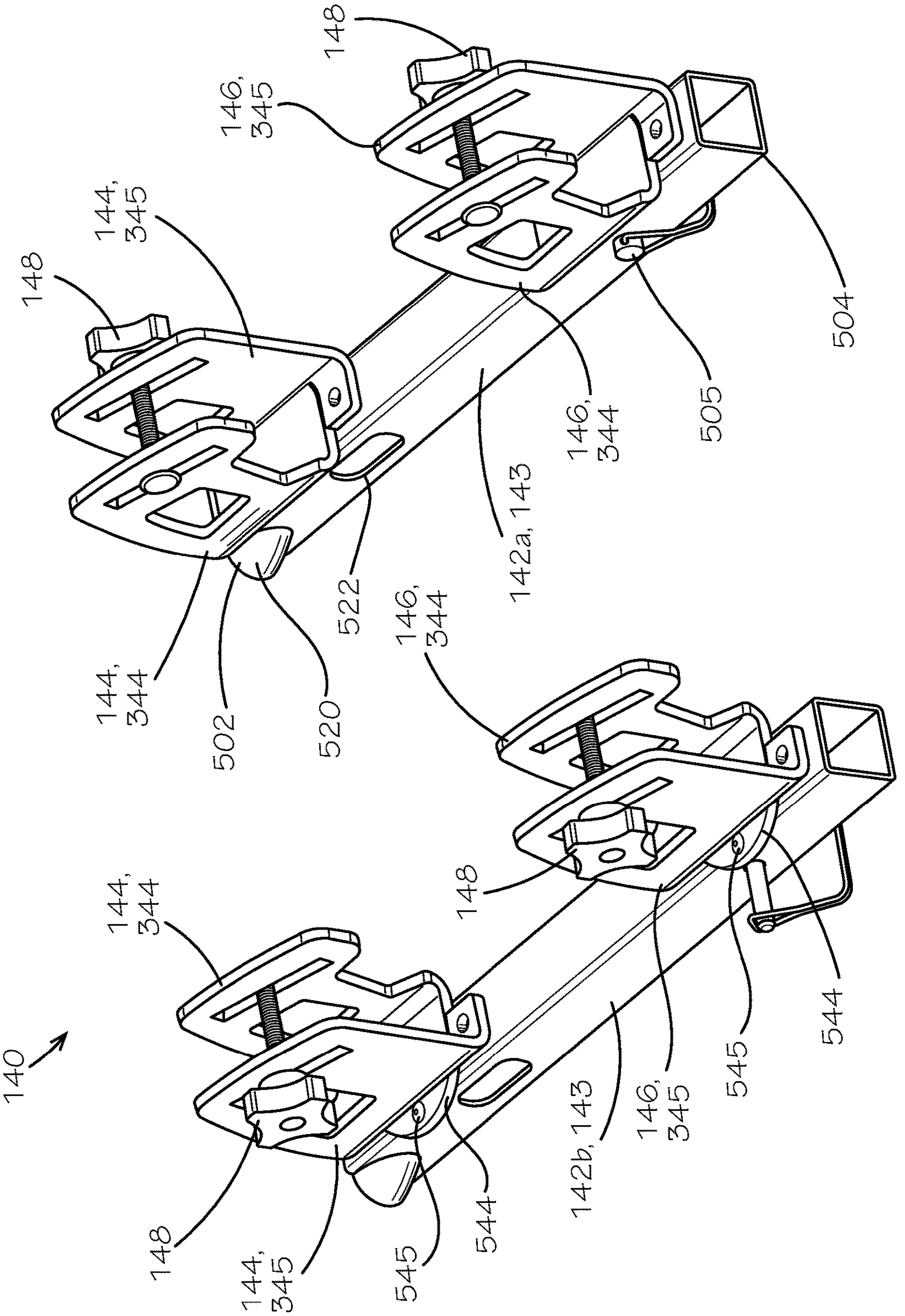
FIG. 5 is a rear perspective view of a frame of the ladder walkthrough of FIG. 1.

FIG. 5 is a perspective view of the frame 140 of FIG. 1. In the present aspect, each outer clamping plate 345 of the respective clamps 144,146 can be rigidly fixed to the adjacent tube 143 of the respective bracket 142*a,b*. As demonstrated by the second bracket 142*b*, the inner clamping plates 344 can each define a sliding tab 544, which can be inserted between the tube 143 and the outer clamping plate 345 of the respective clamps 144,146. The sliding tab 544 can be positioned in facing engagement with the tube 143, and the tube 143 can act as a bearing surface for the sliding tab 544 to slide across. A retention fastener 545 can be inserted into the sliding tab 544, and the retention fastener 545 can be sized and positioned to prevent withdrawal of the sliding tab 544 from between the outer clamping plate 345 and the tube 143. When the tighteners 148 of each clamp 144,146 are tightened, the inner clamping plates 344 can slide towards the outer clamping plates 345, and the clamps 144,146 can tighten onto members, such as the side rails 192*a,b* (shown in FIG. 1) positioned between the clamping plates 344,345.

As demonstrated by the tube 143 of the first bracket 142*a*, the tubes 143 can define a top end 502 and a bottom end 504. The tube 143 can define lower holes (not shown), which can receive a locking pin 505, such as a wire-locking pin for example and without limitation. The bottom ends 504 of the tubes 143 can be configured to receive a pair of standoffs 780 (shown in FIGS. 7-11), and the locking pins 505 can engage the standoffs 780 to secure the standoffs 780 in the tubes 143.

Figure 6:
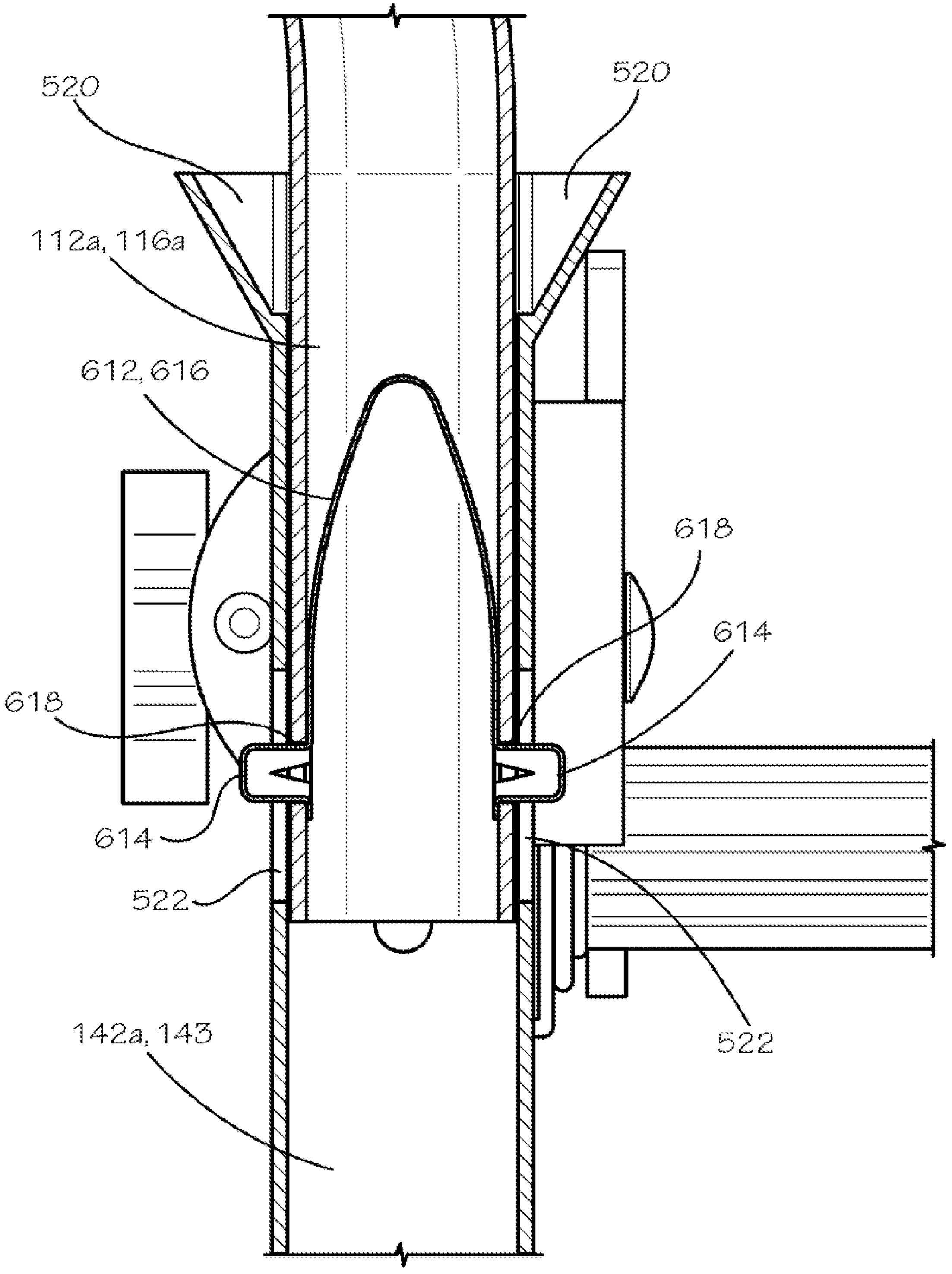
FIG. 6 is a cross-sectional detail view of a bottom portion of a guide post of the ladder walkthrough of FIG. 1 and a bracket of the frame of the ladder walkthrough of FIG. 1.
Figure 7:
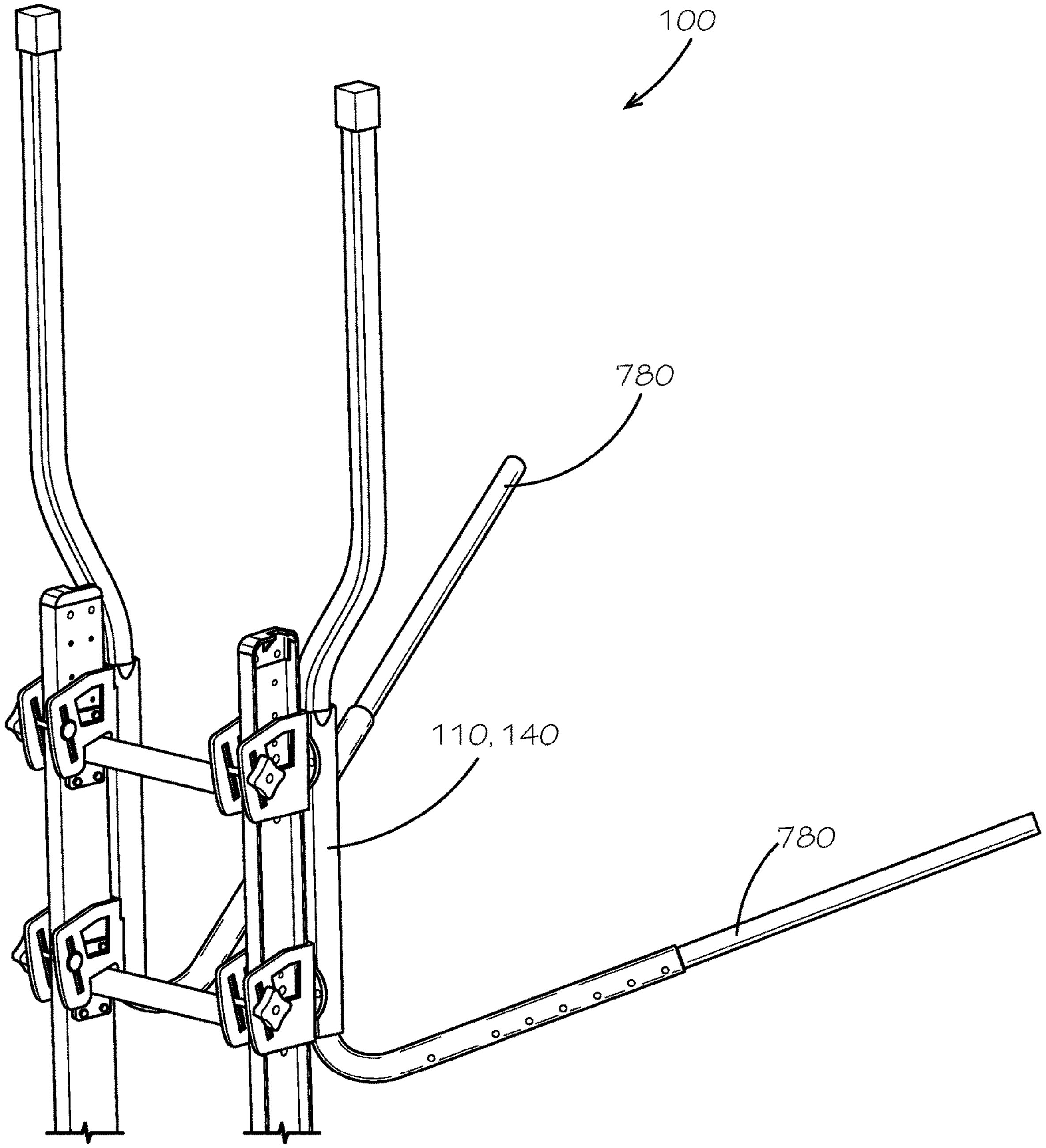
FIG. 7 is a front perspective view of the ladder walkthrough assembly of FIG. 1 further comprising a pair of standoffs in accordance with another aspect of the present disclosure.
Figure 8:
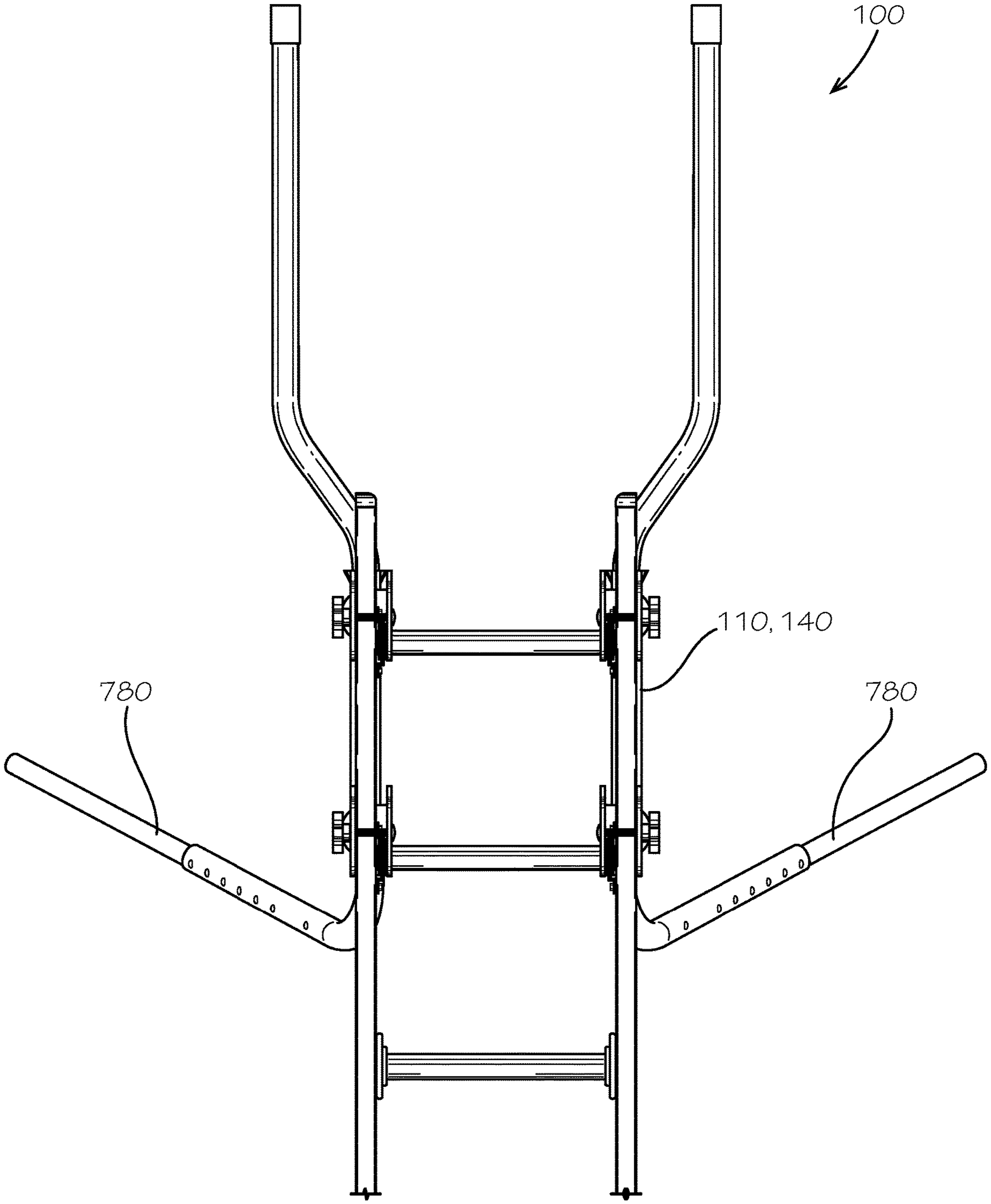
FIG. 8 is a rear view of the ladder walkthrough assembly of FIG. 7.
Figure 9:
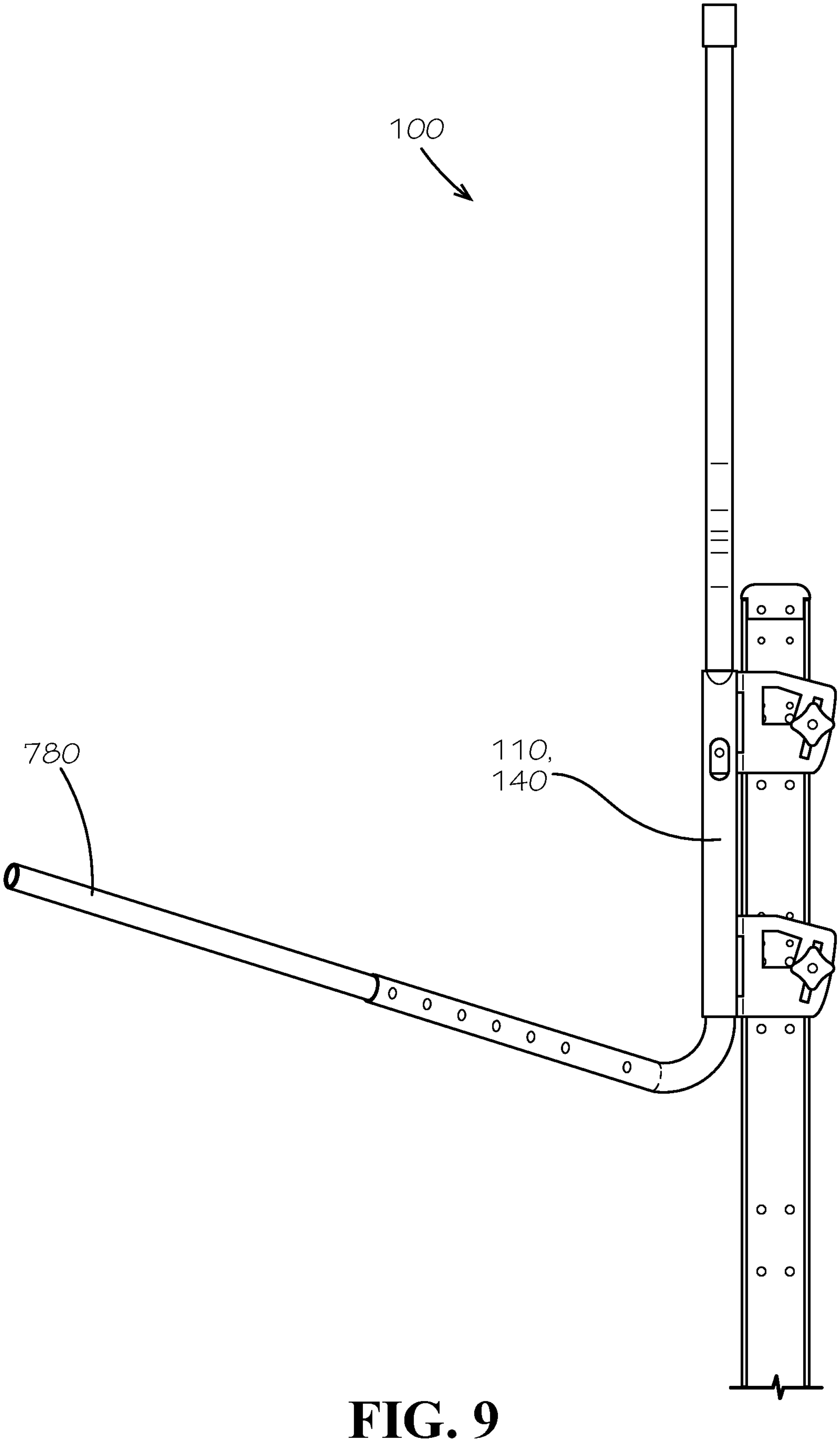
FIG. 9 is a side view of the ladder walkthrough assembly of FIG. 7.
Figure 10:
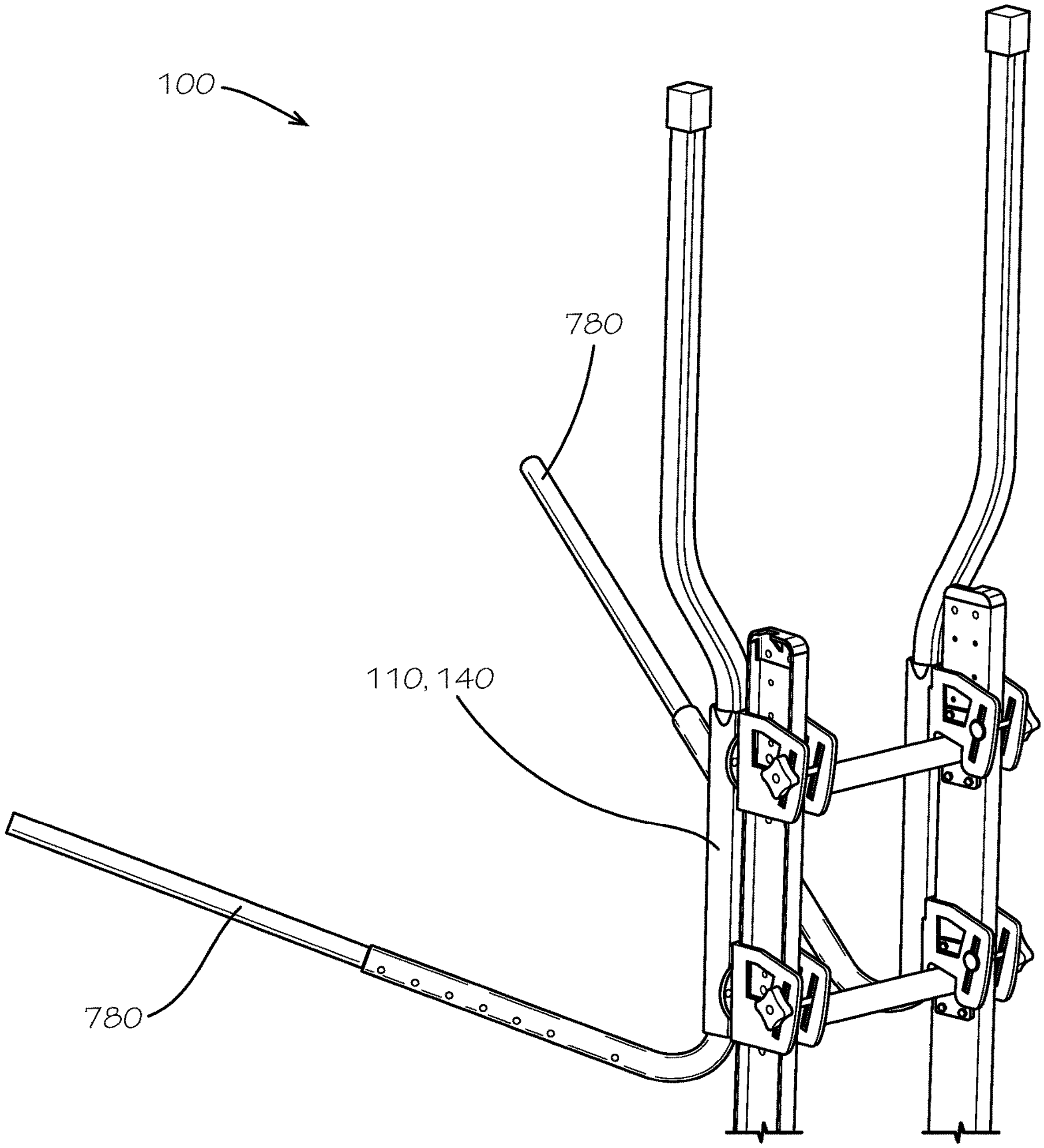
FIG. 10 is a front perspective view of the ladder walkthrough assembly of FIG. 7.

Each of the tubes 143 can define a flared lip 520 at the top end 502 and a pair of opposing locking apertures 522 (one locking aperture 522 shown in FIG. 5, two locking apertures 522 shown in FIG. 6). The flared lip 520 and the locking apertures 522 can be configured to receive the bottom portions 116*a,b* (shown in FIG. 1) of the guide posts 112*a,b* (shown in FIG. 1) to lock the guide post 112*a,b* to the brackets 142*a,b*, as described in greater detail with respect to FIG. 6.

FIG. 6 is a detailed cross-sectional view of the bottom portion 116*a* of the guide post 112*a* received in the tube 143 of the first bracket 142*a*. A spring detent 612 can be positioned within the bottom portion 116*a*. The spring detent 612 can comprise two detent buttons 614 resiliently coupled together by a leaf spring 616, which can bias the detent buttons 614 to extend outward through holes 618 in the bottom portion 116*a*.

The flared lips 520 can slope inwards. When the bottom portion 116*a* is stabbed into the tube 143, the flared lips 520 can depress the detent buttons 614 inward as the bottom portion 116*a* slides into the tube 143. Once the bottom portion 116*a* is inserted far enough to align the detent buttons 614 with the locking apertures 522, the detent buttons 614 can snap outwards through the locking aperture 522 under bias from the leaf spring 616. With the detent buttons 614 engaging the locking apertures 522, the guide post 112*a* cannot be withdrawn from the tube 143 without first manually depressing the detent buttons 614.

FIGS. 7-10 show various views of the ladder walkthrough assembly 100 of FIG. 1, further comprising the standoffs 780 coupled to the frame 140 of the ladder walkthrough 110.

Figure 11:
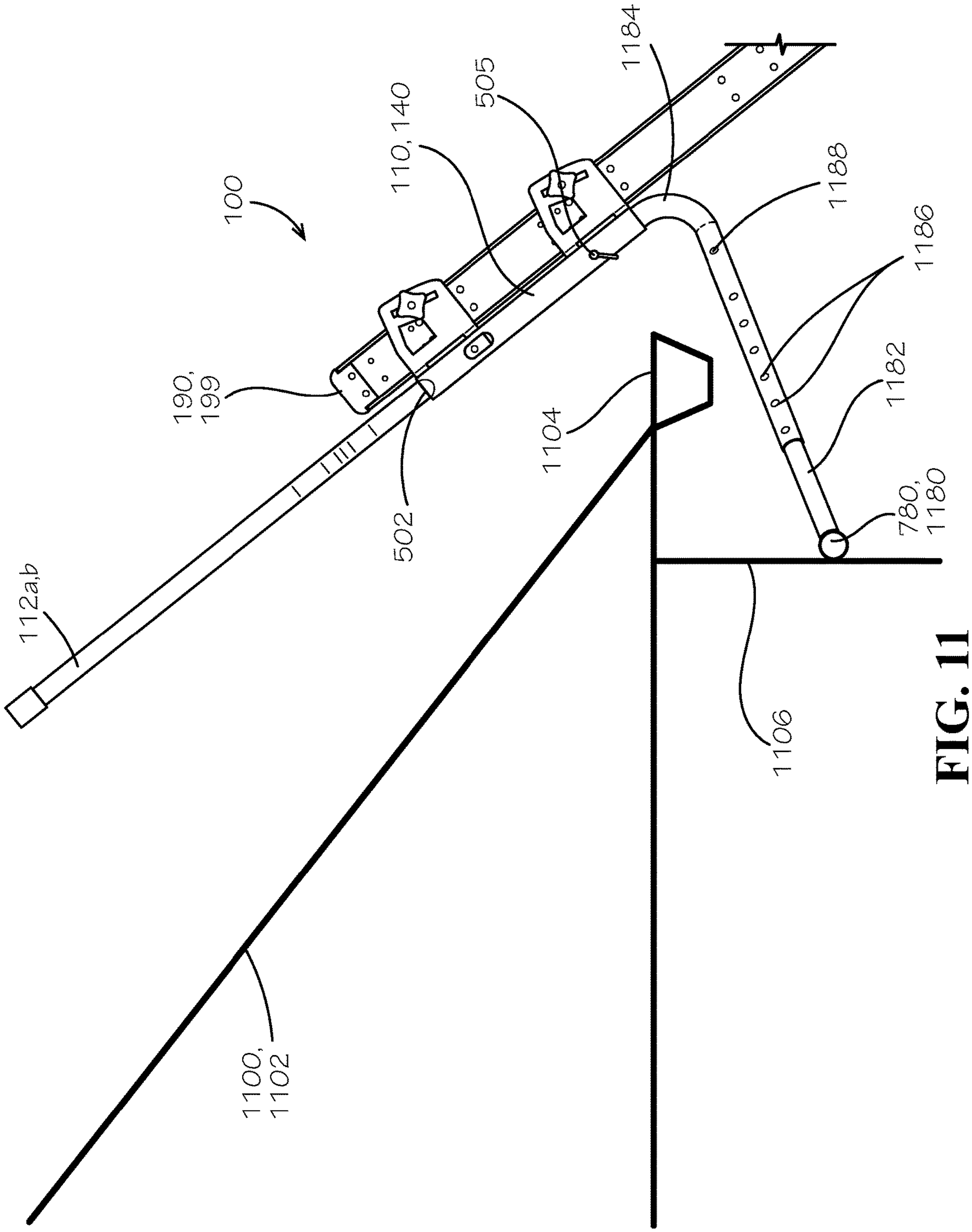
FIG. 11 is a side view of the ladder walkthrough assembly of FIG. 7 positioned against a schematic representation of a building in accordance with another aspect of the present disclosure.

FIG. 11 shows the ladder walkthrough assembly 100 of FIGS. 7-10 positioned against a schematic representation of a building 1100. The building 1100 can comprise a sloped rooftop 1102; however, the ladder walkthrough assembly 100 can be utilized in the same way with a flat rooftop or any other rooftop shape. A gutter 1104 is shown at an edge of the rooftop 1102. The standoffs 780 can be positioned against a wall 1106 of the building 1100, such as an exterior wall for example and without limitation, which can prevent the ladder walkthrough assembly 100 from contacting the gutter 1104. Common gutters 1104 often comprise a thin material, such as sheet aluminum, which can be bent or otherwise deformed when a ladder is rested against the gutter 1104. The standoffs 780 can prevent such damage. The standoffs 780 can comprise protective end covers 1180, such as non-marking rubber caps for example and without limitation, which can engage the wall 1106 without causing damage to the wall 1106. The ladder walkthrough assembly 100 can be utilized without the standoffs 780, and the frame 140 or the ladder 190 can be placed directly against the building 1100.

The standoffs 780 can comprise telescoping end pieces 1182 and mounting pieces 1184. The mounting pieces 1184 can be secured within the frame 140 by the locking pins 505. The mounting pieces 1184 can define a J-shape and can extend out of the frame 140 and bend outwards and away from the ladder 190. The mounting pieces 1184 can define a plurality of adjustment holes 1186. The telescoping end pieces 1182 can be received within and telescope relative to the mounting piece 1184. The standoffs 780 can comprise locking pins 1188, which can engage some of the adjustment holes 1186 and complimentary holes (not shown) defined by the telescoping end pieces 1182 to secure the standoffs 780 at a variety of different lengths, which can optimize the position of the ladder 190 relative to the building 1100.

In use, the frame 140 of the ladder walkthrough 110 can be coupled to the ladder 190. The ladder 190 can then be stood up against the building 1100, such as by placing either the frame 140 or the ladder 190 against the building 1100. If the standoffs 780 are to be utilized, the standoffs 780 can be attached to the frame 140 and adjusted for length prior to standing the ladder up against the building 1100, and the standoffs 780 can be placed in contact with the building 1100. A worker (not shown) can climb the ladder 190 while carrying one or both of the guide posts 112*a,b*. The guide posts 112*a,b* can then be stabbed into the top end 502 of the frame 140 once the worker nears the top end 199 of the ladder 190. The worker can then grasp the guide posts 112*a,b* with their hands for support and step up and over the top end 199 of the ladder 190 and between the guide posts 112*a,b* onto the rooftop 1102.

Alternatively, the ladder 190 can be stood up against the building 1100 with the guide posts 112*a,b* already in place in the frame 140, if desired.

Figure 12:
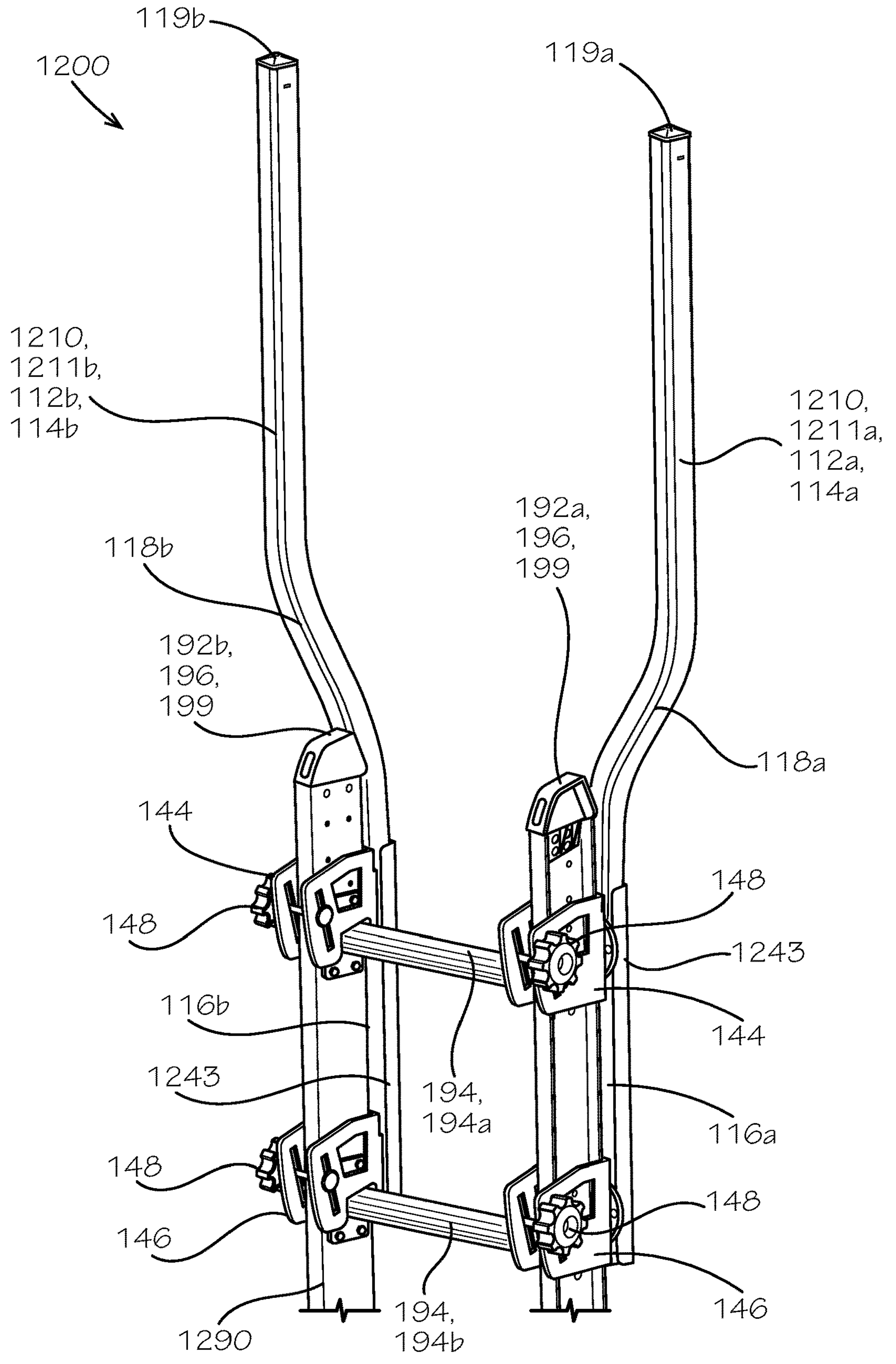
FIG. 12 is a front perspective view of another aspect of the ladder walkthrough assembly comprising another aspect of the ladder and another aspect of the ladder walkthrough in accordance with another aspect of the present disclosure.

FIG. 12 is a front perspective view of another aspect of the ladder walkthrough assembly 1200 comprising another aspect of the ladder walkthrough 1210 and another aspect of the ladder 1290 in accordance with the present disclosure. In the present aspect, the ladder 1290 can be a straight ladder. The ladder 1290 can comprise the pair of side rails 192*a,b* and the plurality of rungs 194. The rungs 194 can extend between and be coupled to each of the side rails 192*a,b*. The top end 199 of the ladder 1290 is shown. Each of the side rails 192*a,b*, can define the rail end 196, and the rail ends 196 can define the top end 199 of the ladder 1290. The rung 194 nearest the top end 199 can be the top rung, or first rung, 194*a*. The rung 194 below the top rung 194*a* can be the second rung 194*b*.

The ladder walkthrough 1210 can comprise a pair of guide-post assemblies 1211*a,b*. Each guide-post assembly 1211*a,b* can comprise the guide post 112*a,b*, the upper clamp 144, and the lower clamp 146. The guide posts 112*a,b* can define a rectangular or square cross-sectional shape, for example and without limitation. Each guide post 112*a,b* can define the top portion 114*a,b*, the bottom portion 116*a,b*, and the transition portion 118*a,b*. The bottom portions 116*a,b* can be coupled to the clamps 144,146. In the present aspect, the clamps 144,146 can be directly secured to the guide posts 112*a,b*. For example, the clamps 144,146 can be fastened to the guide posts 112*a,b*. In some aspects, the clamps 144,146 can be coupled to one or more tubes, which can respectively receive at least a portion of the guide posts 112*a,b*, such as the bottom portions 116*a,b*, for example and without limitation.

The guide-post assemblies 1211*a,b* can further comprise pads 1243. The pads 1243 can be coupled to the guide posts 112*a,b*. Specifically, the pads 1243 can be coupled to the bottom portions 116*a,b* of the guide posts 112*a,b*. The pads 1243 can be positioned on the respective guide posts 112*a,b* opposite from the clamps 144,146. In some aspects, the pads 1243 can comprise a non-marking material, such as a polymer, elastomer, or other suitable material. In some aspects, the pads 1243 can comprise a material with a higher friction coefficient than that of the guide posts 112*a,b*. For example and without limitation, the guide posts 112*a,b* can comprise a metal, rigid polymer, or composite, for example and without limitation, and the pads 1243 can comprise an elastomer, such as a natural or synthetic rubber, for example and without limitation.

The transition portions 118*a,b* can extend between the respective top portions 114*a,b* and bottom portions 116*a,b*. The transition portions 118*a,b* can be shaped to space the top portions 114*a,b* further apart than the bottom portions 116*a, b*. In the present aspect, the bottom portions 116*a,b* can be substantially aligned with the side rails 192*a,b*, and the top portions 114*a,b* can be spaced outward from the side rails 192*a,b*. In the present aspect, the top portions 114*a,b* can be substantially parallel to the bottom portions 116*a,b*. The transition portions 118*a,b* can be angled relative to each of the top portions 114*a,b* and the bottom portions 116*a,b*. In some aspects, the transition portions 118*a,b* can define a curved shape, such as a compound curved shape for example and without limitation.

The clamps 144,146 of each respective guide-post assembly 1211*a,b* can receive one of the side rails 192*a,b*. For example, the clamps 144,146 of the first guide-post assembly 1211*a* can both receive the side rail 192*a*. Each guide-post assembly 1211*a,b* can couple to a different side rail 192*a,b* of the ladder 190. Each clamp 144,146 can comprise the tightener 148, which can be utilized to tighten the clamps 144,146 onto the side rails 192*a,b*, as described in greater detail with respect to FIGS. 15-17. In the present aspect, the tightener 148 can be a bolt and a thumb nut, for example and without limitation. The clamps 144,146 can be configured to fit over the rungs 194 of the ladder 1290. Engagement between the clamps 144,146 and the rungs 194 can prevent the brackets 142*a,b* from sliding down the ladder 1290, such as while the clamps 144,146 are being tightened with the tighteners 148. As shown, the upper clamp 144 can engage with the top rung 194*a*, and the lower clamp 146 can engage with the second rung 194*b*; however, the clamps 144,146 can be engaged with any of the rungs 194 as desired.

With the clamps 144,146 engaged with the top rung 194*a* and the second rung 194*b*, the guide posts 112*a,b* can extend upwards above the top end 199 of the ladder 1290. The guide posts 112*a,b* can comprise protective caps 119*a,b* positioned at opposite ends from the bottom clamps 146.

Figure 13:
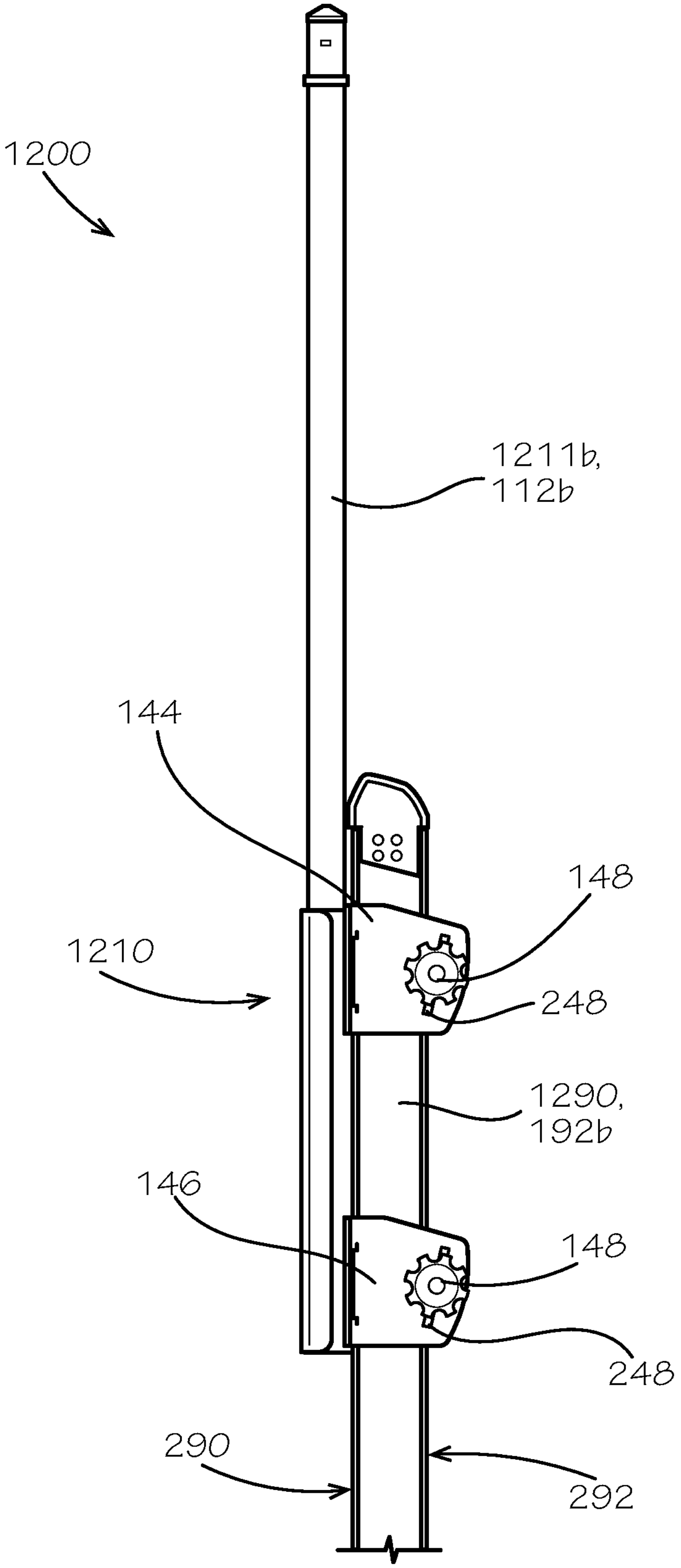
FIG. 13 is a side view of the ladder walkthrough assembly of FIG. 12.

FIG. 13 is a side view of the ladder walkthrough assembly 1200 of FIG. 12. As demonstrated by the side rail 192*b*, each side rail 192*a,b* (side rail 192*a* shown in FIG. 12) can define the first ladder surface 290 and the second ladder surface 292 of the ladder 190. The tighteners 148 can be received within angled slots 248 of the upper clamp 144 and the lower clamp 146. The angled slots 248 can be oriented diagonal to the guide posts 112*a,b* (guide post 112*a* shown in FIG. 12). The angled slots 248 can provide flexibility for the guide-post assemblies 1211*a,b* (first guide-post assembly 1211*a* shown in FIG. 12) to accommodate ladders 1290 of varying thicknesses, as measured between the first ladder surface 290 and the second ladder surface 292. Sliding the tighteners 148 within the angled slots 248 can move the tighteners 148 closer or further from the guide posts 112*a,b*. For example, the first ladder surface 290 can be placed against the clamps 144,146, and the tighteners 148 can slide in the angled slots 248 until the tighteners 148 contact the second ladder surface 292. The tighteners 148 can then be tightened down to secure the guide-post assemblies 1211*a,b* of the ladder walkthrough 1210 to the ladder 1290.

Figure 14:
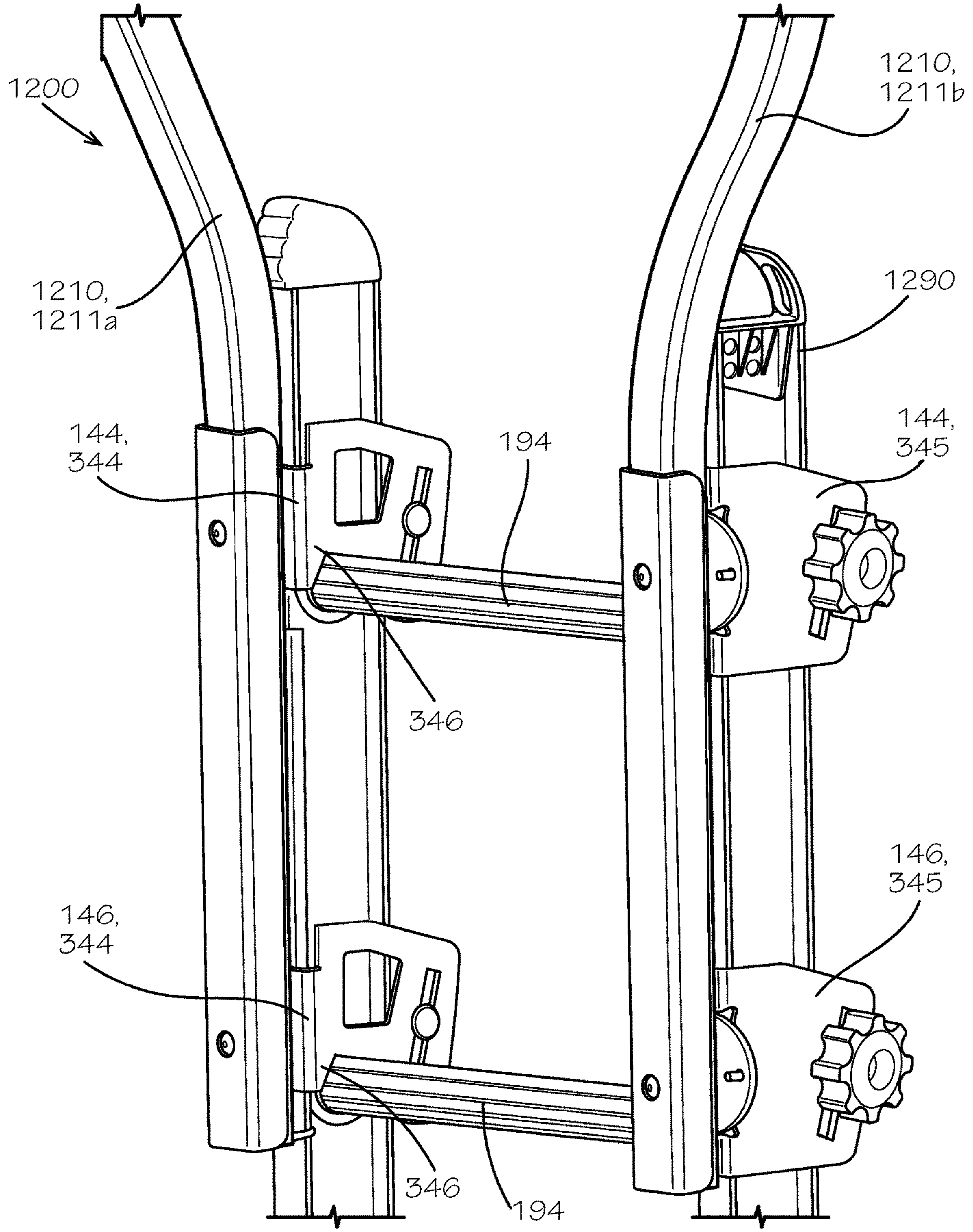
FIG. 14 is a rear perspective detail view of the ladder walkthrough assembly of FIG. 12.

FIG. 14 is a rear perspective detail view of the ladder walkthrough 1210 and the ladder 1290 of the ladder walkthrough assembly 1200 of FIG. 12. The upper clamps 144 and the lower clamps 146 can each comprise the inner clamping plate 344, as shown by the first guide-post assembly 1211*a*, and the outer clamping plate 345, as shown by the second guide-post assembly 1211*b*. The inner clamping plates 344 can each define the rung notch 346, which can be shaped to hook over rungs 194 of the ladder 1290.

Figure 15:
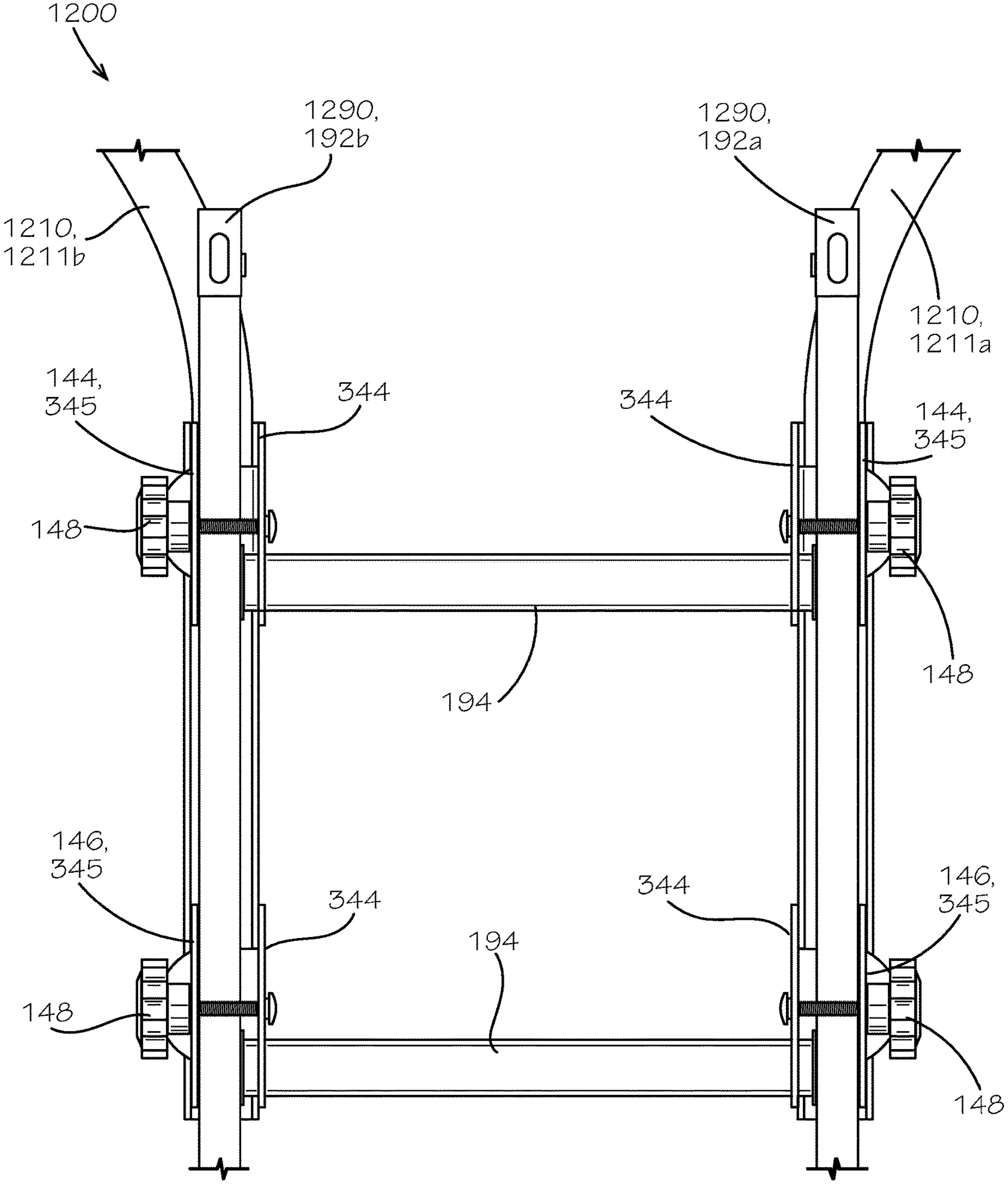
FIG. 15 is front detail view of the ladder walkthrough assembly of FIG. 12.

FIG. 15 is a rear detail view of the ladder walkthrough 1210 and the ladder 1290 of the ladder walkthrough assembly 1200 of FIG. 12. In the present aspect, the rungs 194 can penetrate the side rails 192*a,b*. The clamps 144,146 are shown in the loosened state, wherein one or both of the inner clamping plate 344 and the outer clamping plate 345 of each clamp 144,146 can be spaced apart from the respective side rail 192*a,b*. The clamps 144,146 can be tightened with the tighteners 148 so that the inner clamping plates 344 and the outer clamping plates 345 each engage one of the side rails 192*a,b*.

Figure 16:
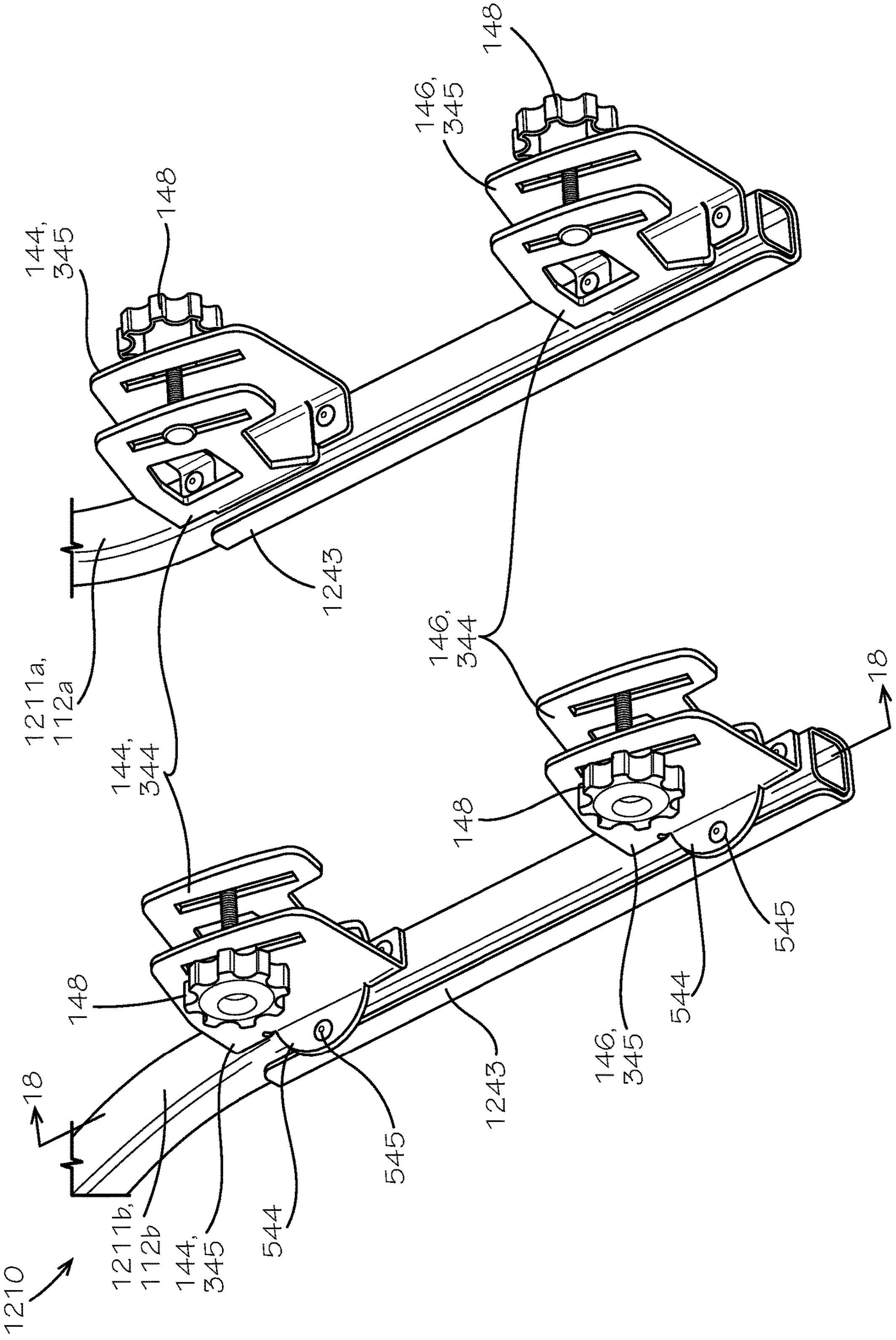
FIG. 16 is a front perspective view of a frame of the ladder walkthrough of FIG. 12.

FIG. 16 is a perspective view of the ladder walkthrough 1210 of FIG. 12. The pads 1243 can be rigidly fixed to the adjacent guide post 112*a,b* of the respective guide-post assembly 1211*a,b*. The pads 1243 can have a C-shaped, or channel-shaped, profile, and the pads 1243 can at least partially cover three sides of the respective guide post 112*a,b*.

In the present aspect, each outer clamping plate 345 of the respective clamps 144,146 can be rigidly fixed to the adjacent guide post 112*a,b* of the respective guide-post assembly 1211*a,b*, opposite from the respective pad 1243. As demonstrated by the second guide-post assembly 1211*b*, the inner clamping plates 344 can each define the sliding tab 544, which can be inserted between the adjacent guide post 112*a,b* and the outer clamping plate 345 of the respective clamps 144,146. The sliding tab 544 can be positioned in facing engagement with the guide post 112*a,b*, and the guide post 112*a,b* can act as a bearing surface for the sliding tab 544 to slide across. The retention fastener 545 can be inserted into the sliding tab 544, and the retention fastener 545 can be sized and positioned to prevent withdrawal of the sliding tab 544 from between the outer clamping plate 345 and the respective guide post 112*a,b*. In the present aspect, the retention fastener 545 can be a rivet. In some aspects, the retention fastener 545 can be a different type of fastener, such as a screw, bolt, roll pin, stud, or other suitable type of fastener.

Figure 17:
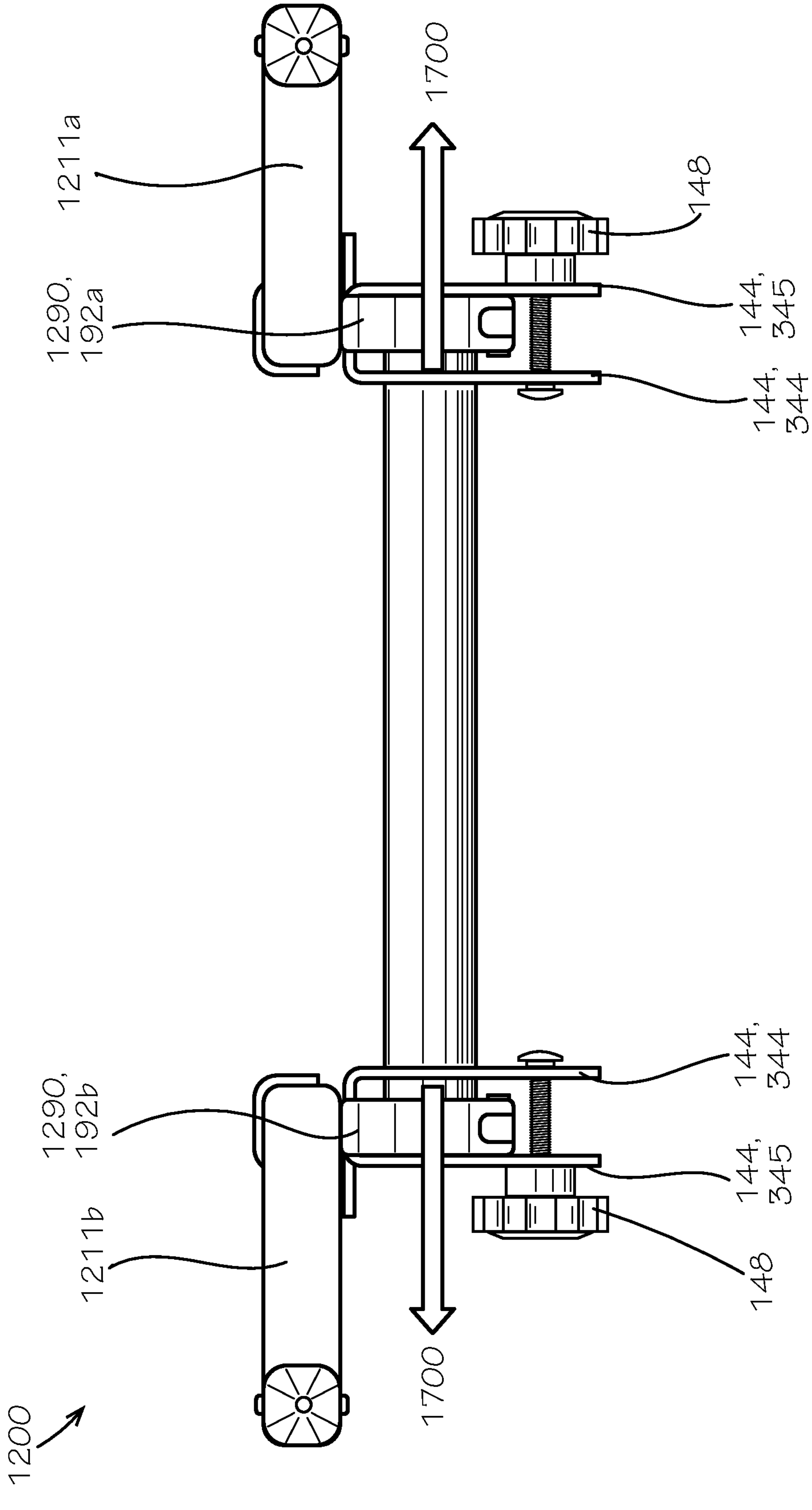
FIG. 17 is top end view of the ladder walkthrough assembly of FIG. 12 showing a pair of guide-post assemblies of the ladder walkthrough of FIG. 12.

As demonstrated in FIG. 17 by the upper clamps 144, when the tighteners 148 of each clamp 144,146 (lower clamps 146 shown in FIG. 16) are tightened, the inner clamping plates 344 can slide towards the outer clamping plates 345, and the clamps 144,146 can tighten onto members, such as the side rails 192*a,b* (shown in FIG. 1) positioned between the clamping plates 344,345, as demonstrated by directional arrows 1700. In some aspects, the inner clamping plates 344 can be fixed, and the outer clamping plates 345 can slide when the tightener 148 is operated.

Figure 18:
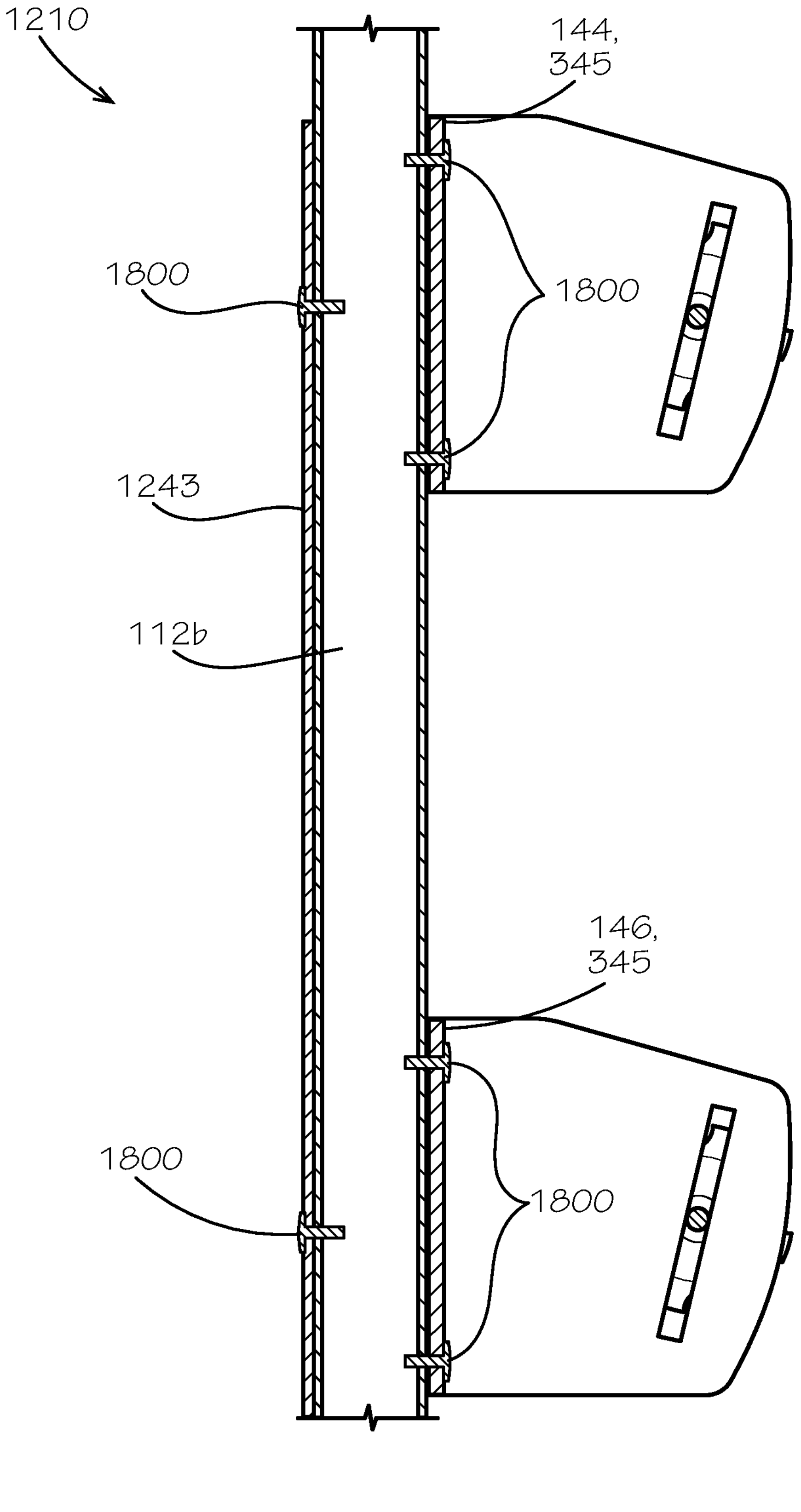
FIG. 18 is a cross-sectional view of the ladder walkthrough of FIG. 12 taken along line 18-18 shown in FIG. 16.

FIG. 18 is a detailed cross-sectional view of the ladder walkthrough 1210, taken along line 18-18 of FIG. 16. As demonstrated, the pads 1243 and the outer clamping plates 345 of the clamps 144,146 can be fastened to the respective guide posts 112*a,b* (guide post 112*a* shown in FIG. 16) with fasteners 1800. In the aspect shown, the fasteners 1800 can be rivets. In some aspects, the fasteners 1800 can be screws, bolts, studs, roll pins, other suitable fasteners, or a mix thereof.

Figure 19:
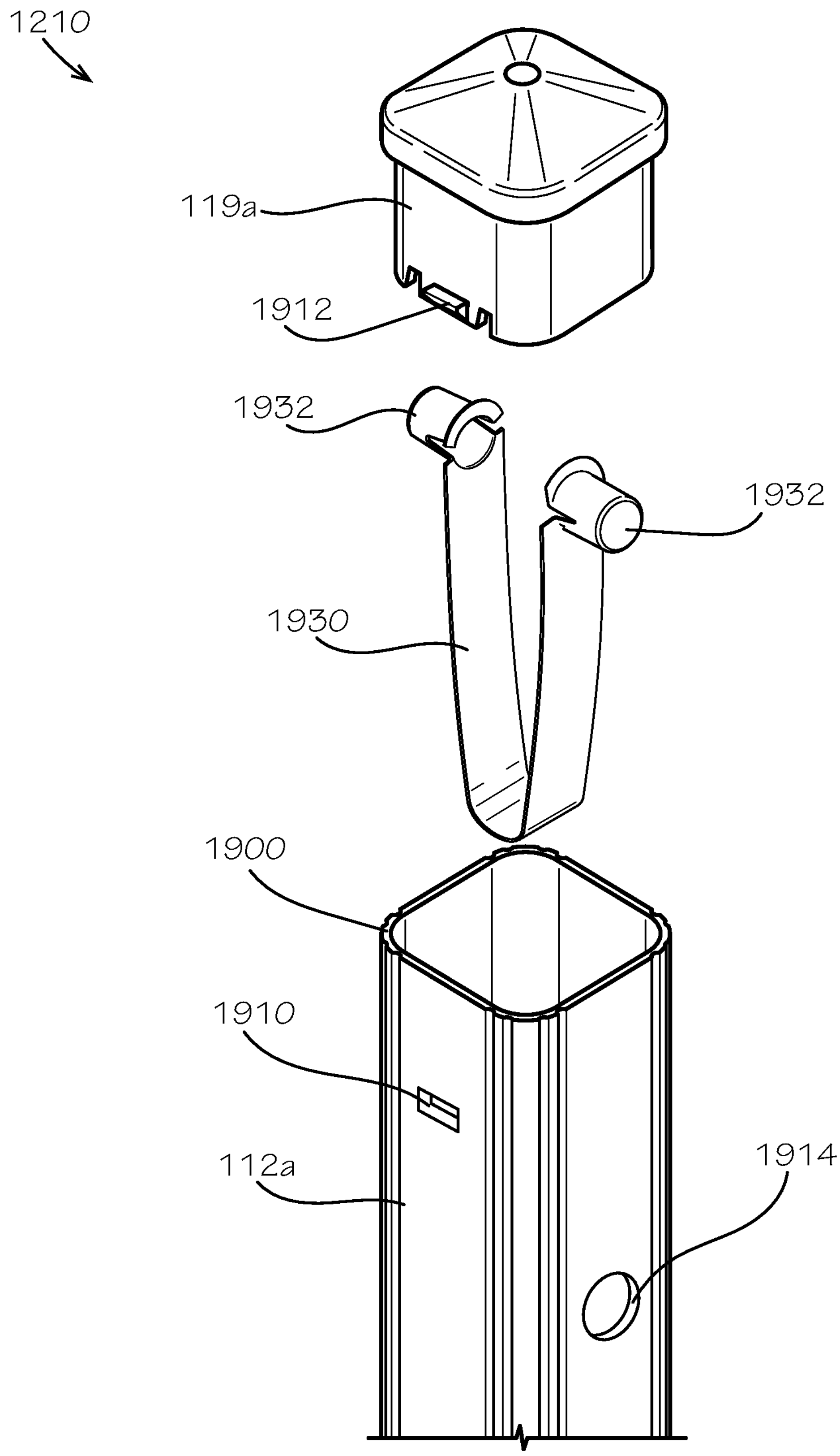
FIG. 19 is a perspective exploded view of a top end of one of the guide-post assemblies of FIG. 17.

FIG. 19 is an exploded view of a top end 1900 of the guide post 112*a*, which can also be representative of a top end of guide post 112*b* (shown in FIG. 12). The guide posts 112*a,b* can be at least partially hollow. In some aspects, the guide post 112*a* can define at least one slot 1910 and/or at least one hole 1914 near the top end 1900. The protective caps 119*a* can define at least one tab 1912. The at least one tab 1912 can be configured to engage the at least one slot 1910 when the protective cap 119*a* is inserted into the top end 1900 of the guide post 112*a* to secure the protective cap 119*a* to the guide post 112*a*. In some aspects, a detent spring 1930 can be inserted into the guide post 112*a*. The detent spring 1930 can define at least one button portion 1932 configured to engage the at least one hole 1914. When installed, the at least one button portion 1932 can extend outwards from the guide post 112*a* and provide a mechanism for securing an accessory, such as a gate (not shown) to the ladder walkthrough 110. For example and without limitation, a tube (not shown) with a similar but slightly larger profile than the guide post 112*a* can be slipped over the guide post 112*a*, and the at least one button portion 1932 can engage at least one hole in the tube to secure the tube onto the guide post 112*a*.

Figure 20:
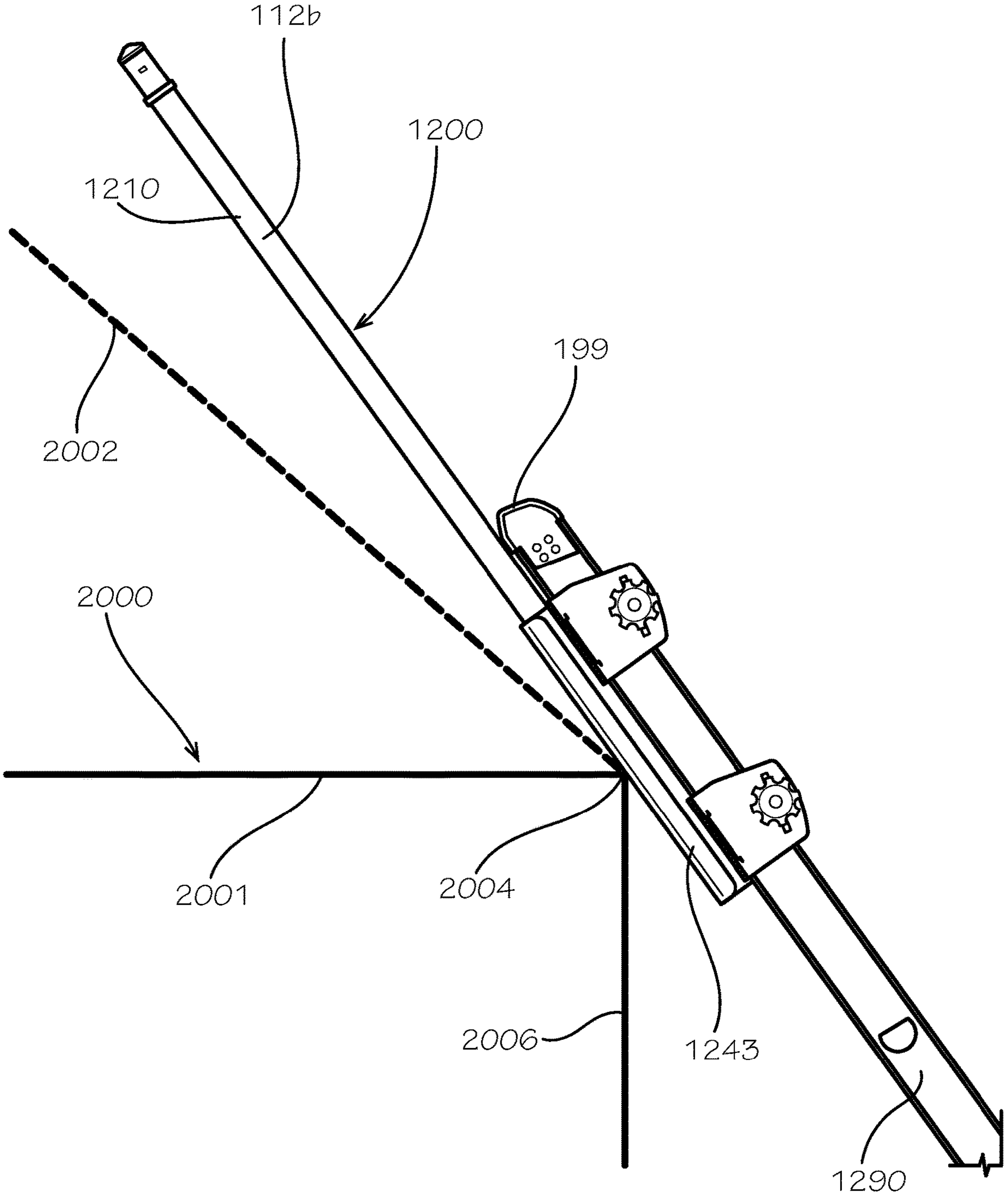
FIG. 20 is a side view of the ladder walkthrough assembly of FIG. 12 positioned against a schematic representation of a building in accordance with another aspect of the present disclosure.

FIG. 20 shows the ladder walkthrough assembly 1200 of FIG. 12 positioned against a schematic representation of a building 2000. The building 2000 can be a substantially flat-top design, such as found on many offices, shopping centers, or other buildings, with a flat-top roof 2001. In some aspects, the building 2000 can define a sloped roof 2002 of any angle, as represented by the dashed line. The pads 1243 can be rested against a top edge 2004 of the building wall 2006, or a gutter (similar to the gutter 1104 shown in FIG. 11) for buildings equipped with gutters at the edge of the rooftop. The pads 1243 can be configured to protect the building 2000, such as through the use of soft and/or non-marking materials. The pads 1243 can be configured to provide a high friction coefficient to prevent the ladder walkthrough assembly 1200 from sliding on the building 2000.

In use, the ladder walkthrough 1210 can be coupled to the ladder 1290. The ladder 1290 can then be stood up against the building 2000, such as by placing either the pads 1243 or the ladder 1290 against the building 2000. The worker can climb to the top end 199 of the ladder 1290 and then grasp the guide posts 112*a,b* (guide post 112*a* shown in FIG. 1) with their hands for support and step up and over the top end 199 of the ladder 1290 and between the guide posts 112*a,b* onto the roof, such as flat-top roof 2001 or sloped roof 2002.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A ladder walkthrough assembly comprising:

a ladder comprising a plurality of rungs between a pair of rails, each rail defining a first ladder surface on an outer surface of the rail and a second ladder surface on an outer surface of the rail on an opposite side of the rung from the first ladder surface, a distance on the rail between the first ladder surface and the second ladder surface defining a thickness of the ladder; and a ladder walkthrough comprising:

a frame comprising a bracket extending between an upper clamp and a lower clamp coupled to the ladder, the upper clamp and the lower clamp each coupled to the first ladder surface and each comprising a tightener within an angled slot oriented diagonally to the second ladder surface, wherein the tightener slides through the angled slot to accommodate the thickness and contacts the second ladder surface; and a guide post coupled to the first ladder surface of the ladder, the guide post coupled to the bracket of the frame and extending upwards above a top end of the first ladder surface of the ladder.

2. The ladder walkthrough assembly of claim 1, wherein the bracket is a first bracket coupled to a first side rail of the ladder and the frame further comprises a second bracket coupled to a second side rail of the ladder.

3. The ladder walkthrough assembly of claim 2, wherein the first bracket comprises a tube and the upper clamp and the lower clamp are coupled to the tube, and wherein the tube receives the guide post.

4. The ladder walkthrough assembly of claim 3, wherein the ladder walkthrough further comprises a standoff coupled to the frame, and wherein the tube receives the standoff.

5. The ladder walkthrough assembly of claim 1, wherein the ladder walkthrough further comprises a standoff coupled to the frame, and wherein the standoff extends away from the ladder.

6. The ladder walkthrough assembly of claim 1, wherein the upper clamp and the lower clamp engage a side rail of the ladder.

7. The ladder walkthrough assembly of claim 6, wherein the upper clamp and the lower clamp define a rung notch, and wherein the rung notch receives a rung of the ladder.

8. The ladder walkthrough assembly of claim 1, further comprising a standoff engaged in a tube of the bracket, the tube defining a flared lip, wherein a first portion of the standoff is engaged in the tube with a pin, and a second portion of the standoff is engaged with a structure.

9. A ladder walkthrough assembly comprising:

a ladder comprising a first ladder surface and a second ladder surface opposite the first ladder surface, a distance from the first ladder surface to the second ladder surface defining a thickness of the ladder; and a ladder walkthrough comprising at least one guide-post assembly, the at least one guide-post assembly comprising a guide post received in a frame on the first ladder surface of the ladder, guide post assembly comprising a bracket extending between an upper clamp and a lower clamp, the upper clamp and the lower clamp each coupled to the first ladder surface and each comprising a tightener within an angled slot oriented diagonally to the second ladder surface, wherein the tightener slides through the diagonal of the angled slot to accommodate the thickness and contacts the second ladder surface, the guide post secured to the bracket and the upper clamp and the lower clamp receiving the ladder.

10. The ladder walkthrough assembly of claim 9, wherein the at least one guide-post assembly further comprises a pad coupled to the guide post.

11. The ladder walkthrough assembly of claim 10, wherein the pad is coupled to the guide post opposite from the upper clamp and the lower clamp.

12. The ladder walkthrough assembly of claim 9, wherein the at least one guide-post assembly comprises a first guide-post assembly coupled to a first side rail of the ladder and a second guide-post assembly coupled to a second side rail of the ladder.

13. The ladder walkthrough assembly of claim 9, wherein the upper clamp engages the ladder above a top rung of the ladder and the lower clamp engages the ladder above a second rung of the ladder.

14. The ladder walkthrough assembly of claim 9, wherein at least one of the upper clamp and the lower clamp defines a rung notch, and wherein the rung notch receives a rung of the ladder.

15. The ladder walkthrough assembly of claim 9, wherein the upper clamp and the lower clamp each comprise an inner clamping plate and an outer clamping plate.

16. A method for using a ladder walkthrough assembly comprising a ladder walkthrough and a ladder comprising a first ladder surface and a second ladder surface opposite the first ladder surface, a distance between the first ladder surface and the second ladder surface defining a thickness of the ladder, the method comprising:

coupling the ladder walkthrough to the ladder comprising:

engaging a first frame comprising a bracket between an upper clamp and a lower clamp of the ladder walkthrough with the first ladder surface of a first side rail of the ladder, the upper clamp comprising a tightener within an angled slot oriented diagonally to the second ladder surface, wherein the tightener contacts the second ladder surface; and engaging a second frame comprising a bracket between an upper clamp and a lower clamp of the ladder walkthrough with the first ladder surface of a second side rail of the ladder, the lower clamp comprising a tightener within an angled slot oriented diagonally to the second ladder surface, wherein the tightener contacts the second ladder surface; and positioning the upper clamps and lower clamps of the first frame and the second frame, respectively, on the first side rail and the second side rail of the ladder and the ladder walkthrough assembly within the bracket of the first frame and the bracket of the second frame to secure the ladder walkthrough assembly against a structure.

17. The method of claim 16, wherein engaging the first frame of the ladder walkthrough with the first side rail of the ladder comprises engaging a rung notch of at least one of the upper clamp and the lower clamp of the first frame with a rung of the ladder.

18. The method of claim 16, further comprising positioning a guide post of the ladder walkthrough extending upwards above a top end of the ladder.

19. The method of claim 18, wherein the first frame is coupled to the guide post.

20. The method of claim 18, wherein the first frame is coupled to a tube, and wherein the tube receives the guide post.

21. The method of claim 16, wherein positioning the ladder walkthrough assembly against the structure comprises engaging a standoff of the ladder walkthrough with the structure.

* * * * *